(12) United States Patent
Zhao et al.

(10) Patent No.: US 10,626,541 B2
(45) Date of Patent: Apr. 21, 2020

(54) HYDRAULIC LEVELING DEVICE OF WASHING MACHINE AND FILLING METHOD THEREOF

(71) Applicants: QINGDAO HAIER WASHING MACHINE CO., LTD., Laoshan District, Qingdao, Shandong (CN); QINGDAO HAIER SMART TECHNOLOGY R&D CO., LTD., Laoshan District, Qingdao, Shandong (CN)

(72) Inventors: Zhiqiang Zhao, Shandong (CN); Sheng Xu, Shandong (CN)

(73) Assignees: QINGDAO HAIER WASHING MACHINE CO., LTD., Qingdao, Shandong (CN); QINGDAO HAIER SMART TECHNOLOGY R&D CO., LTD., Qingdao, Shandong (CN)

( * ) Notice: Subject to any disclaimer, the term of this patent is extended or adjusted under 35 U.S.C. 154(b) by 177 days.

(21) Appl. No.: 15/562,473

(22) PCT Filed: Dec. 28, 2016

(86) PCT No.: PCT/CN2016/112603
§ 371 (c)(1),
(2) Date: Sep. 28, 2017

(87) PCT Pub. No.: WO2018/049756
PCT Pub. Date: Mar. 22, 2018

(65) Prior Publication Data
US 2018/0355546 A1    Dec. 13, 2018

(30) Foreign Application Priority Data

Sep. 18, 2016 (CN) .......................... 2016 1 0828448

(51) Int. Cl.
*F16M 7/00* (2006.01)
*D06F 39/12* (2006.01)
(Continued)

(52) U.S. Cl.
CPC ............ *D06F 39/125* (2013.01); *D06F 37/22* (2013.01); *D06F 37/24* (2013.01); *D06F 39/12* (2013.01);
(Continued)

(58) Field of Classification Search
CPC .. B23Q 5/26; B25J 9/14; D06F 39/125; D06F 39/12
(Continued)

(56) References Cited

U.S. PATENT DOCUMENTS

| 1,346,330 A * | 7/1920 | Mitchell | ................. F16L 33/23 |
| | | | 285/114 |
| 3,954,241 A * | 5/1976 | Carlson | .................. A47B 91/16 |
| | | | 248/188.3 |

(Continued)

*Primary Examiner* — Steven M Marsh
(74) *Attorney, Agent, or Firm* — Buchanan Ingersoll & Rooney PC

(57) ABSTRACT

A washing machine hydraulic leveling device comprises hydraulic feet, wherein each hydraulic foot comprises a fixed part and a movable part, a hollow chamber is formed between the fixed part and the movable part, and the hollow chamber is provided with a hydraulic medium; two said hydraulic feet communicate with each other through high-pressure oil pipes: the hydraulic medium flows under pressure between the hollow chambers of the hydraulic feet to drive the movable parts to extend and retract, thereby implementing automatic leveling; and the fixed parts are provided with oil nipples communicating with the hollow chambers, and the oil nipples of the two hydraulic feet are connected to a same connecting piece through the high-pressure oil pipes, thereby implementing communication between the two hydraulic feet.

18 Claims, 16 Drawing Sheets

(51) Int. Cl.
  *D06F 37/22* (2006.01)
  *F16F 15/023* (2006.01)
  *D06F 37/24* (2006.01)
  *F15B 15/10* (2006.01)
  *F15B 21/00* (2006.01)
  *F16F 13/06* (2006.01)

(52) U.S. Cl.
  CPC ............ *F15B 15/10* (2013.01); *F15B 21/005* (2013.01); *F16F 15/023* (2013.01); *F16M 7/00* (2013.01); *F16F 13/06* (2013.01); *F16M 2200/08* (2013.01)

(58) Field of Classification Search
  USPC ......... 248/188.1, 188.2, 188.5, 188.8, 188.9, 248/654
  See application file for complete search history.

(56) References Cited

U.S. PATENT DOCUMENTS

| | | | | |
|---|---|---|---|---|
| 4,949,923 | A * | 8/1990 | Daily | F16M 7/00 248/188.3 |
| 4,967,994 | A * | 11/1990 | Rice | D06F 39/001 248/649 |
| 10,221,517 | B2 * | 3/2019 | Zhao | D06F 39/12 |
| 10,227,723 | B2 * | 3/2019 | Zhao | A47B 91/16 |
| 2006/0180720 | A1 * | 8/2006 | Coumoyer | A47B 91/02 248/188.2 |
| 2007/0023590 | A1 * | 2/2007 | Lotz | D06F 39/125 248/188.2 |
| 2007/0023591 | A1 * | 2/2007 | Kwon | D06F 39/125 248/188.3 |
| 2013/0313385 | A1 * | 11/2013 | Mora | F16M 7/00 248/188.4 |
| 2018/0328438 | A1 * | 11/2018 | Zhao | F16F 15/023 |

* cited by examiner

HYDRAULIC LEVELING DEVICE OF WASHING MACHINE AND FILLING METHOD THEREOF

TECHNICAL FIELD

The present disclosure relates to the technical field of washing machines, and particularly relates to a washing machine hydraulic leveling device and a filling method thereof.

BACKGROUND

A household appliance is generally provided with a leveling device at the bottom of its casing. During placement of the household appliance, the leveling device is adjusted to make the household appliance stably placed, and after the household appliance is leveled, the leveling device is able to support the household appliance to keep the household appliance stable.

Taking a washing machine as an example, the existing washing machine is usually provided with bolt feet mounted at the bottom of its casing or the whole machine. Each bolt foot comprises a screw rod, a nut washer and a rubber pad, the nut washer can be screwed up and down around the screw rod, and the screw rod can also be screwed up and down in a screw hole in a base plate of the casing. Therefore, the height of the washing machine can be adjusted by screwing the screw rods of the bolt feet into different lengths of the screw holes of the base plate. Mostly, the height of the washing machine is increased if the feet of the washing machine rotate counterclockwise, and the height of the washing machine is reduced if the feet of the washing machine rotate clockwise. After the height adjustment of the bolt feet is completed, the nut washers for preventing loosening are tightened to keep the washing machine stable.

Although said bolt feet of the washing machine implement the leveling of the washing machine, a user still needs to carry out manual adjustment, and if the washing machine has a relatively large self weight or a placement space for the washing machine is narrow, user operations will be very inconvenient. Additionally, vibration of the washing machine in a long-term working process also influences the leveling feet and causes support failure of the feet, resulting in unlevel placement of the washing machine.

For example, an existing 80 KG drum washing machine generally has a weight of about 80 KG, which is relatively heavy, so its height adjustment is very inconvenient for users, and even though the height adjustment is completed, it cannot be ensured that the washing machine is adjusted to an optimal state. When the washing machine works, especially accelerates from 0 r/min to about 1400 r/min for drying, large vibration will occur if the washing machine is placed unlevel or has a weak leg problem, which greatly influences use comfortableness of the user.

In addition, the vibration of the unlevel washing machine may cause loosening of foot screws which result in vertical movement of a foot bracket, and such unstability may change the leveling state of the washing machine and cause stronger vibration. Due to such vicious circle, after the washing machine is used for a long term, the noise is larger and larger, the washing machine per se is also damaged to a certain extent, and the service life of the washing machine is shortened.

Therefore, the leveling of the existing washing machine has problems that manual adjustment is needed, time and labor are wasted, and precision is relatively low.

In view of the foregoing, the present disclosure is proposed.

SUMMARY

To solve the problems described above, a first object of the present disclosure is to provide a washing machine hydraulic leveling device. Specifically, a technical solution adopted by the present disclosure is as follows.

A washing machine hydraulic leveling device is characterized in comprising hydraulic feet, wherein each hydraulic foot comprises a fixed part and a movable part, a hollow chamber is formed between the fixed part and the movable part, and the hollow chamber is provided with a hydraulic medium. And two said hydraulic feet communicate with each other through high-pressure oil pipes: the hydraulic medium flows under pressure between the hollow chambers of the hydraulic feet to drive the movable parts to extend and retract, thereby implementing automatic leveling.

The fixed part is provided with an oil nipple communicating with the hollow chamber, and the oil nipples of the two hydraulic feet are connected to a same connecting piece through the high-pressure oil pipes, thereby implementing communication between the two hydraulic feet.

Further, each hydraulic foot comprises two oil nipples, the connecting piece comprises four connecting oil nipples which communicate with each other in a pairwise manner, and each pair of communicating connecting oil nipples communicate with the oil nipples of the two hydraulic feet through the high-pressure oil pipes, respectively.

Further, the connecting piece comprises a main cavity, each of two ends of the main cavity is provided with two connecting oil nipples, and the main cavity is internally provided with two flow channels for communicating the four connecting oil nipples at the two ends of the main cavity with each other in a pairwise manner.

Further, an oil hole and a vent hole are formed in the main cavity corresponding to the two flow channels, respectively, and a sealing member is mounted on each of the oil hole and the vent hole.

Further, the sealing member comprises a sealing bolt and a sealing gasket, the oil hole and the vent hole are both sealing screw holes matching with the sealing bolts, and the sealing gaskets are mounted between the sealing bolts and the sealing screw holes.

Further, the high-pressure oil pipe and the oil nipple of the hydraulic foot are in sealed connection through a clamping piece, and the high-pressure oil pipe and the connecting oil nipple of the connecting piece are in sealed connection through the clamping piece.

Further, the clamping piece is a hoop, and the hoop comprises two clamping sleeves which sleeve the high-pressure oil pipes, and a connecting part which connects the two clamping sleeves.

Further, the oil nipple of the hydraulic foot and the connecting oil nipple of the connecting piece each comprises a chamfer part which is located at an end of the nipple to enable the high-pressure oil pipe to be easily inserted into, and a barb part which is located behind the chamfer part and used for preventing the high-pressure oil pipe from dropping out.

Further, the fixed part of the hydraulic foot is a sheath, and the movable part of the hydraulic foot is an adjusting foot arranged in the sheath and moves axially relative to the sheath.

The hydraulic foot further comprises a flexible assembly which is arranged in the adjusting foot and is used for accommodating the hydraulic medium, one end of the flexible assembly is mounted in the sheath in a limiting manner, the other end of the flexible assembly is used as a telescopic end acting on the adjusting foot, and the telescopic end extends and retracts under action of the hydraulic medium to drive the adjusting foot to move axially, thereby implementing automatic leveling.

The flexible assembly comprises an oil press plate and an oil bag, an opening of the oil bag is in sealed connection with the oil press plate, and the oil nipple is arranged on the oil press plate and communicate with the oil bag.

A second object of the present disclosure is to provide a filling method of the washing machine hydraulic leveling device. Specifically, a technical solution adopted by the present disclosure is as follows.

A filling method of the washing machine hydraulic leveling device according to any one of foregoing items comprises the following steps that:
the oil hole and the vent hole are opened;
an oiling device is connected to the oil hole, and hydraulic oil is injected into the oil hole;
the hydraulic oil flows into the two hydraulic feet through the high-pressure oil pipes from the two connecting oil nipples corresponding to the oil hole, respectively;
the hydraulic oil flows into the other group of high-pressure oil pipes after the two hydraulic feet are filled up with the hydraulic oil, and air in the high-pressure oil pipes and the hydraulic feet is discharged through the vent hole under pressure of the hydraulic oil in a filling process; and
the oil hole and the vent hole are closed after the filling process is completed.

The hydraulic leveling device of the present disclosure is provided with two hydraulic feet, the two hydraulic feet are separately connected with respective high-pressure oil pipes, and the high-pressure oil pipes are connected to the same connecting piece, so that communication of the two hydraulic feet is implemented, and then the hydraulic medium flows between the two hydraulic feet to implement automatic leveling.

REFERENCE SIGNS

100—axial limiting device; 101—circlip; 102—limiting bulge; 103—hole; 200—flexible assembly; 210—limiting plate; 211—limiting claw; 212—limiting plate mounting hole; 220—oil press plate; 221—oil nipple; 222—oil press plate mounting hole; 223—sealing groove; 224—oil hole; 225—sealing rib; 226—oil passage; 230—press plate; 231—press plate mounting hole; 232—sealing press-fit step; 233—press plate lower ring; 240—upper protection ring; 241—mounting hole; 242—mounting groove; 243—chamfer structure; 250—oil bag; 251—opening; 252—throttling narrow neck; 253—corrugated structure; 300—adjusting foot; 301—hollow chamber; 302—guide limiting block; 303—cylinder body; 400—elastic washer; 401—reinforcing fitting rib; 402—damping rib; 500—sheath; 501—guide limiting groove; 502—limiting groove; 503—sheath fixing hole; 504—sheath plane; 505—ring groove; 506—sheath body; 507—stopping part; 600—ground; 601—ground pit; 700—high—pressure oil pipe; 800—hydraulic foot; 901—base plate; 902—first mounting hole; 903—second mounting hole; 904—third mounting hole; 905—front panel; 906—side panel; 907—reinforcing press profile; 1000—fixed foot; 1100—band; 1200—window; 1300—hoop; 1301—clamping sleeve; 1302—connecting part; 1303—transition chamfer; 1400—sealing member; 1401—sealing gasket; 1402—sealing bolt; 1500—connecting piece; 1501—connecting oil nipple; 1502—flow channel; 1503—sealing screw hole; 1504—chamfer part; 1505—barb part; 1506—oil hole; and 1507—vent hole.

DETAILED DESCRIPTION

The present disclosure is described in details below in conjunction with the drawings.

Embodiment 1

Figure 18:
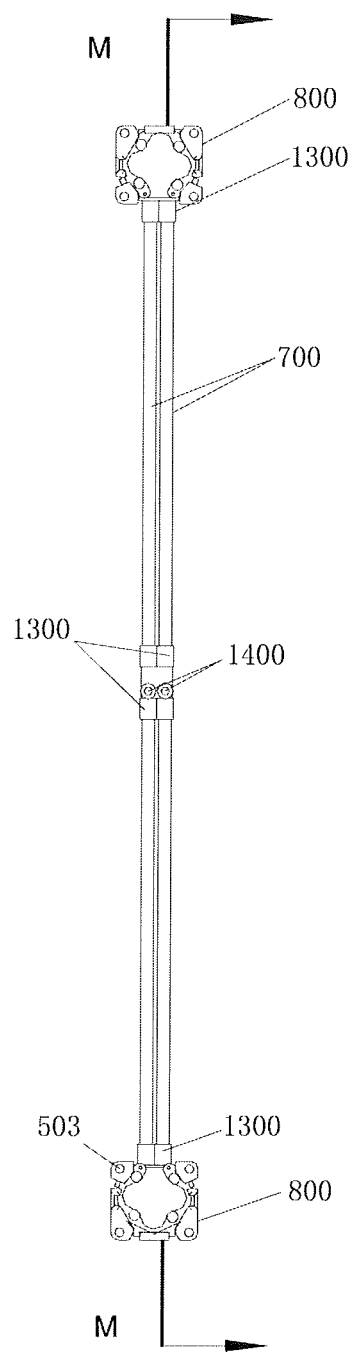
FIG. 18 is a front view of a hydraulic foot according to an embodiment of the present disclosure.
Figure 19:
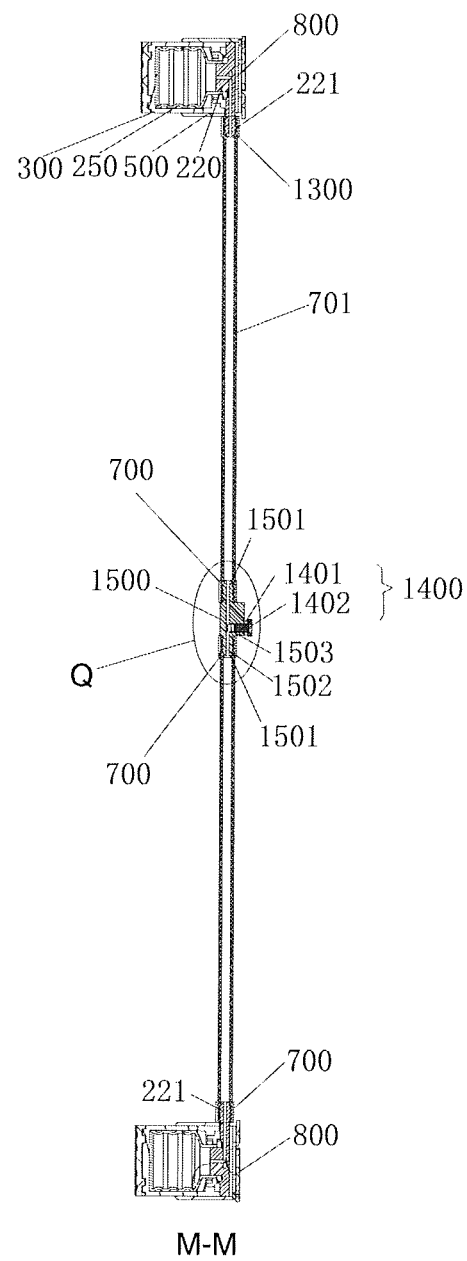
FIG. 19 is a cutaway view of the hydraulic foot according to the embodiment of the present disclosure taken along section M-M in FIG. 18.
Figure 20:
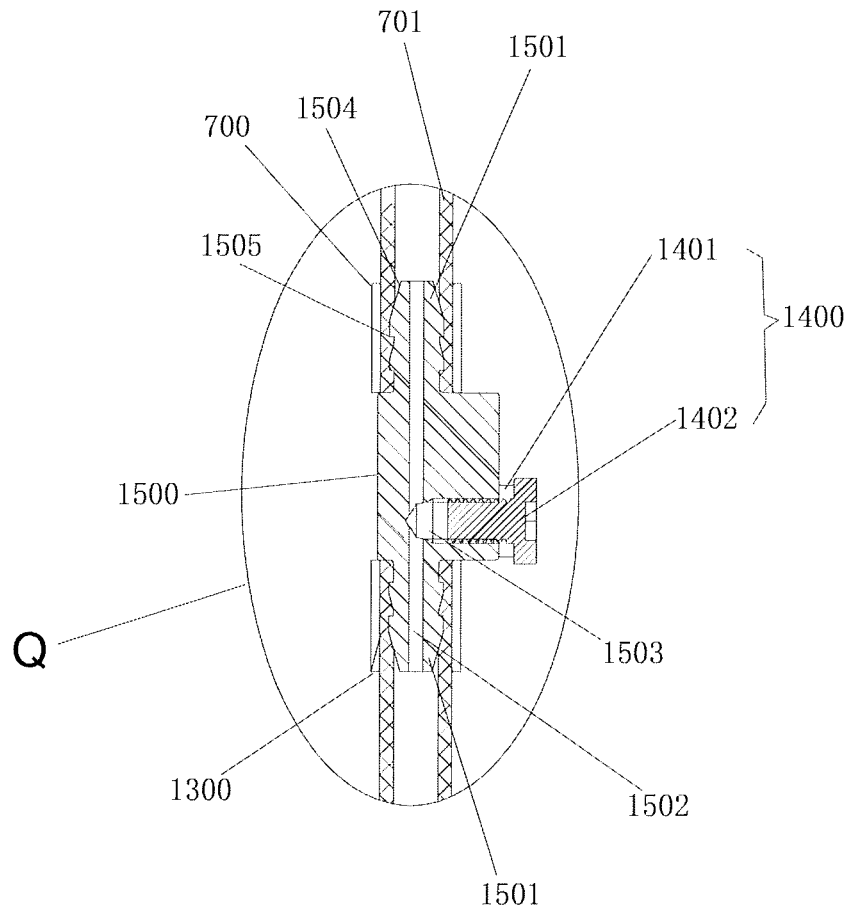
FIG. 20 is an enlarged view of a Q part of the hydraulic foot according to the embodiment of the present disclosure in FIG. 19.

As shown in FIG. 18 and FIG. 19, in this embodiment, a washing machine hydraulic leveling device comprises a hydraulic foot 800, wherein the hydraulic foot 800 comprises a fixed part and a movable part, a hollow chamber is formed between the fixed part and the movable part, and the hollow chamber is provided with a hydraulic medium. And two said hydraulic feet 800 communicate with each other through high-pressure oil pipes 700: the hydraulic medium flows under pressure between the hollow chambers of the hydraulic feet 800 to drive the movable parts to extend and retract, thereby implementing automatic leveling.

As shown in FIG. 19, in this embodiment, the fixed part is provided with oil nipple 221 communicating with the hollow chamber, and the oil nipples 221 of the two hydraulic feet are connected to a same connecting piece 1500 through the high-pressure oil pipes 700, thereby implementing communication between the two hydraulic feet.

In this embodiment, the hydraulic leveling device comprises two hydraulic feet, the two hydraulic feet are separately connected with respective high-pressure oil pipes 700, and the high-pressure oil pipes 700 are connected to the same connecting piece, so that communication between the two hydraulic feet is implemented, and then the hydraulic medium flows between the two hydraulic feet in order to implement automatic leveling.

Specifically, in this embodiment, each hydraulic foot 800 comprises two oil nipples 221, the connecting piece comprises four connecting oil nipples 1501 which communicate with each other in a pairwise manner, and each pair of the communicating connecting oil nipples 1501 communicate with the oil nipples 221 of the two hydraulic feet 800 through the high-pressure oil pipes, respectively. In this embodiment, each hydraulic foot 800 is provided with two oil nipples 221, so that on one hand, the hydraulic medium flows with a large flux and the leveling can be achieved more quickly and directly, and on the other hand, it is convenient to fill the hydraulic feet with the hydraulic medium.

Figure 21:
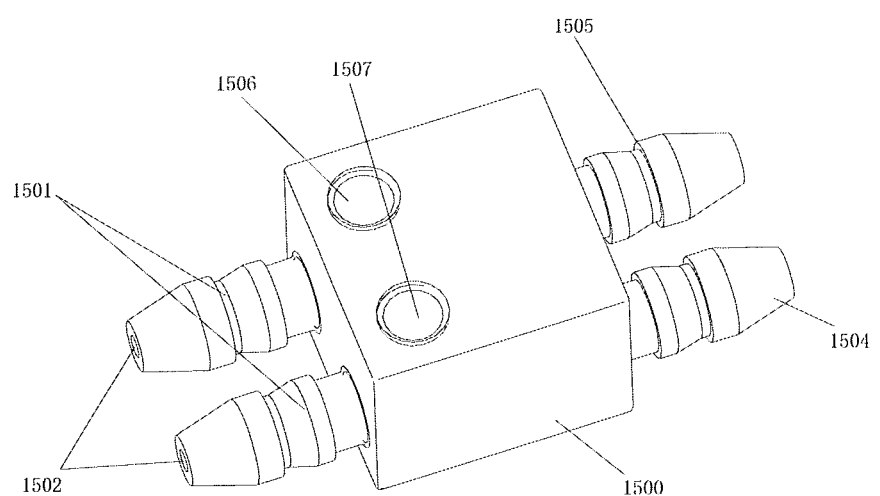
FIG. 21 is a stereo-structure schematic diagram of a connecting piece according to an embodiment of the present disclosure.

As shown in FIG. 21, in this embodiment, the connecting piece 1500 comprises a main cavity, each of two ends of the main cavity is provided with two connecting oil nipples 1501, and the main cavity is internally provided with two flow channels 1502 for communicating the four connecting oil nipples at the two ends of the main cavity with each other in a pairwise manner.

In this embodiment, an oil hole 1506 and a vent hole 1507 are formed in the main cavity corresponding to the two flow channels 1502, respectively, and a sealing member 1400 is mounted on each of the oil hole 1506 and the vent hole 1507.

In this embodiment, the oil hole 1506 is used for injecting the hydraulic medium into the high-pressure oil pipes 700 and the hydraulic feet 800, and the vent hole 1507 can keep open in a filling process to discharge air in the high-pressure oil pipes 700 and the hydraulic feet 800, so that it is ensured that the hydraulic medium is in a vacuum environment, and operation is stable.

In this embodiment, the sealing member 1400 keep the connecting piece 1500 sealed after the filling is completed, thereby ensuring that the hydraulic medium smoothly flows between the two hydraulic feet 800.

The sealing member 1400 may be in various forms, and as an implementation mode of this embodiment, the sealing member 1400 comprises a sealing bolt 1402 and a sealing gasket 1401, the oil hole 1506 and the vent hole 1507 are both sealing screw holes 1503 matching with the sealing bolts 1402, and the sealing gasket 1401 is mounted between the sealing bolts 1402 and the sealing screw holes 1503. In this embodiment, the sealing bolts 1402 and the sealing screw holes 1503 are matched with each other, and the sealing gaskets 1401 are mounted between the sealing bolts 1402 and the sealing screw holes 1503 to ensure that the mounting is sealed, thereby providing simplicity, convenience and good stability.

As an implementation mode of this embodiment, in order to ensure sealed connections between the high-pressure oil pipes 700 and the hydraulic feet 800 and between the high-pressure oil pipes 700 and the connecting piece 1500, the high-pressure oil pipes 700 and the oil nipples 221 of the hydraulic feet 800 are in sealed connection through a clamping piece, and the high-pressure oil pipes 700 and the connecting oil nipples 1501 of the connecting piece 1500 are in sealed connection through a clamping piece.

Figure 22:
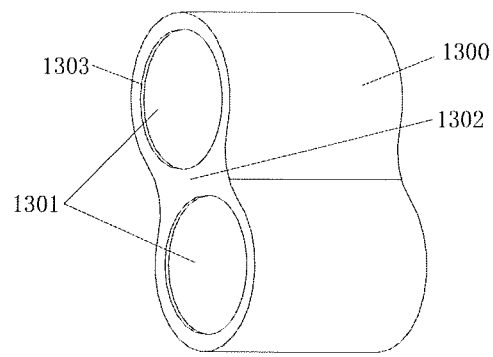
FIG. 22 is a stereo-structure schematic diagram of a hoop according to an embodiment of the present disclosure.

As shown in FIG. 22, specifically, the clamping piece is a hoop 1300, and the hoop 1300 comprises two clamping sleeves 1301 which sleeve the high-pressure oil pipes 700, and a connecting part 1302 which connects the two clamping sleeves 1301.

Further, in this embodiment, both open ends of each clamping sleeve 1301 are provided with transition chamfers 1303 to help the corresponding high-pressure oil pipes 700 to be inserted into the clamping sleeve 1301.

In this embodiment, the connecting oil nipples 1501 of the connecting piece 1500 each comprises a chamfer part 1504 which is located at an end of the nipple to enable the high-pressure oil pipe 700 to be easily inserted into, and a barb part 1505 which is located behind the chamfer part 1504 and used for preventing the high-pressure oil pipes 700 from dropping out. Similarly, the oil nipples 221 of the hydraulic feet 800 also comprise chamfer parts and barb parts with the same structure as that of the connecting oil nipples 1501.

Further, the clamping sleeve 1301 of the hoop 1300 has an inner diameter larger than a maximum diameter of the oil nipple 221 and a maximum diameter of the connecting oil nipple 1501, and smaller than an outer diameter of the high-pressure oil pipe 700. Therefore, after the hoop 1300 along with the high-pressure oil pipe 700 are pressed onto the oil nipple 221 and the connecting oil nipple 1501, the high-pressure oil pipe 700 forms a deformed sealing part which fills up the barb structure of the oil nipple 221 and the connecting oil nipple 1501, so that the high-pressure oil pipe does not drop out even under a very large pressure.

A preferred method for pressing the high-pressure oil pipe 700 onto the oil nipple 221 and the connecting oil nipple 1501 is to carry out a thermal treatment on the high-pressure oil pipe 700, so that the high-pressure oil pipe 700 is easier to deform, and the hoop 1300 along with the high-pressure oil pipe 700 are easier to be pressed onto the oil nipple 221 and the connecting oil nipple 1501.

Figure 1:
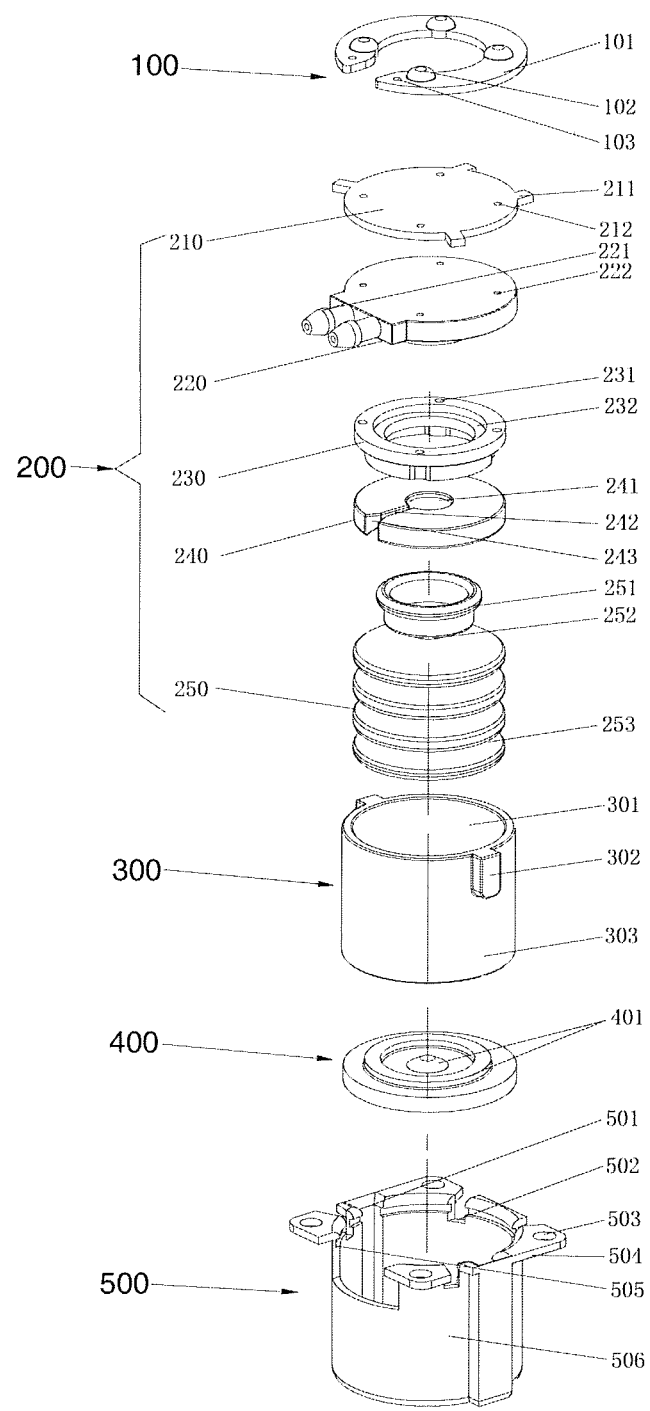
FIG. 1 is a first exploded view of a hydraulic foot of a washing machine according to an embodiment of the present disclosure.
Figure 2:
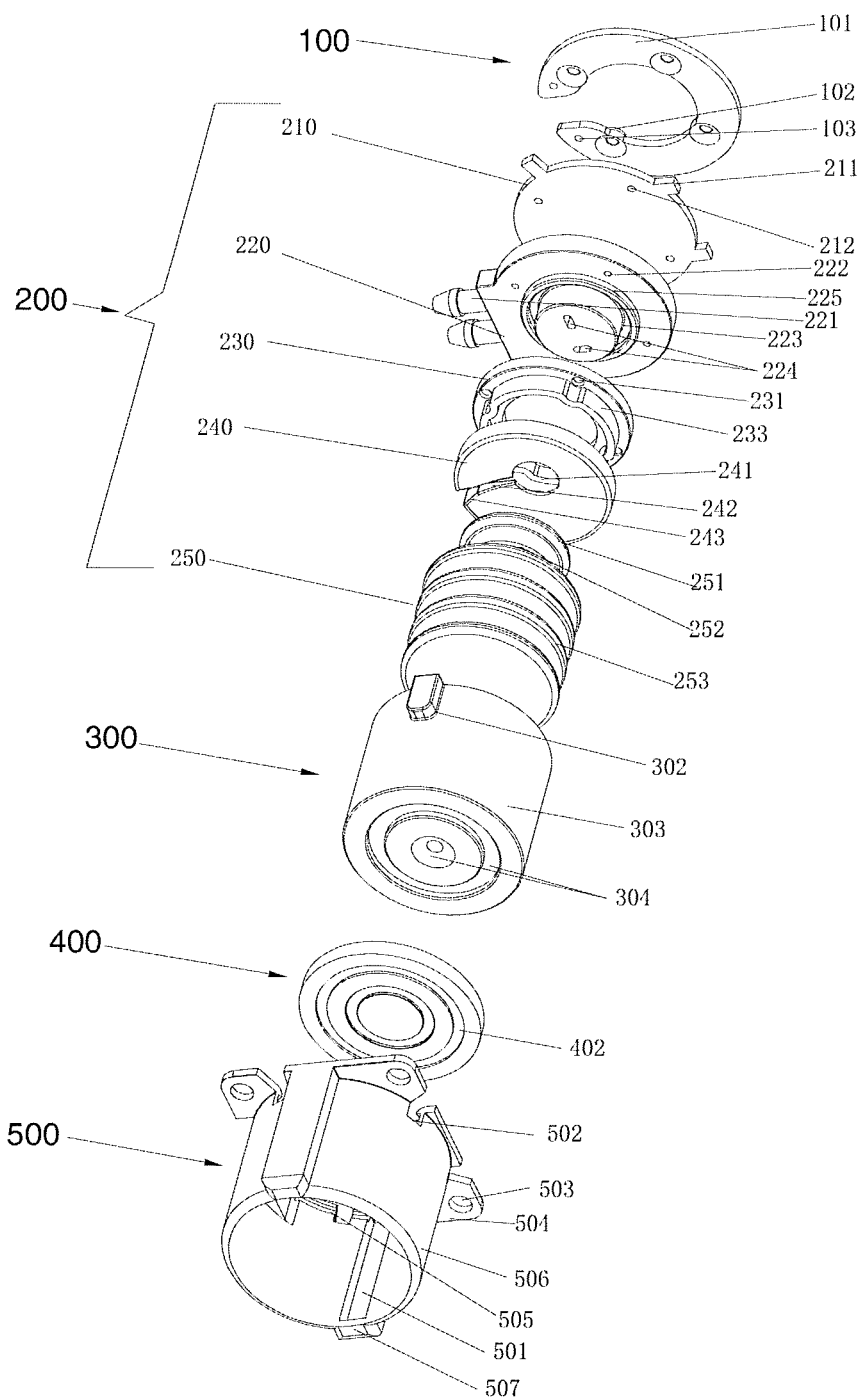
FIG. 2 is a second exploded view of a hydraulic foot of a washing machine according to an embodiment of the present disclosure.
Figure 3:
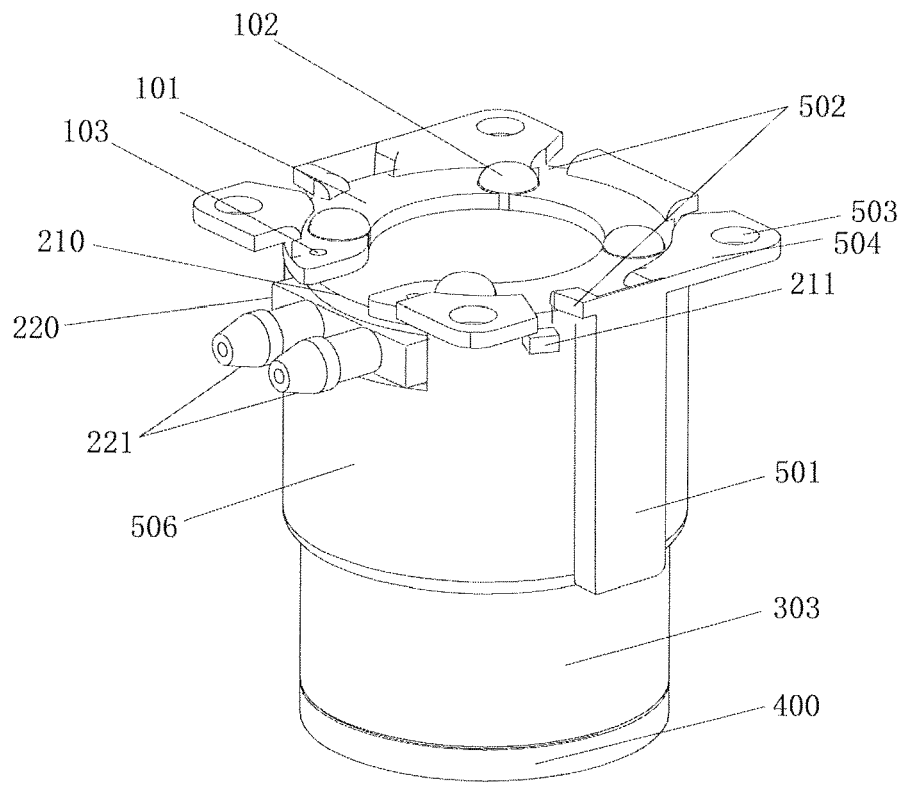
FIG. 3 is a stereo-structure schematic diagram of a hydraulic foot of a washing machine according to an embodiment of the present disclosure.
Figure 4:
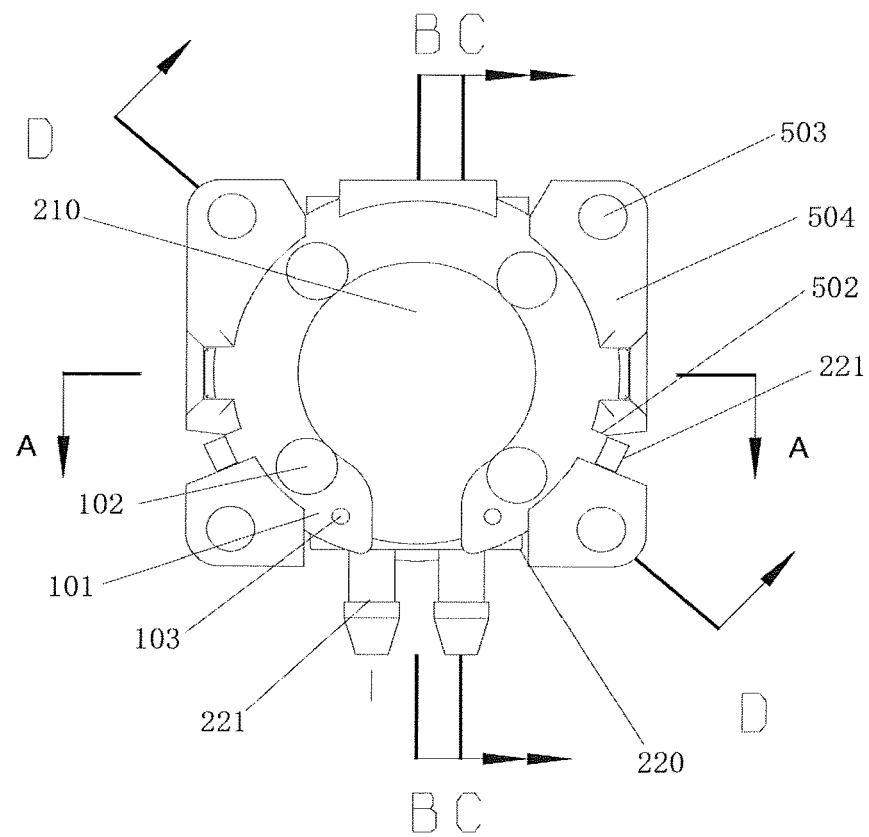
FIG. 4 is a top view of a hydraulic foot of a washing machine according to an embodiment of the present disclosure.
Figure 5:
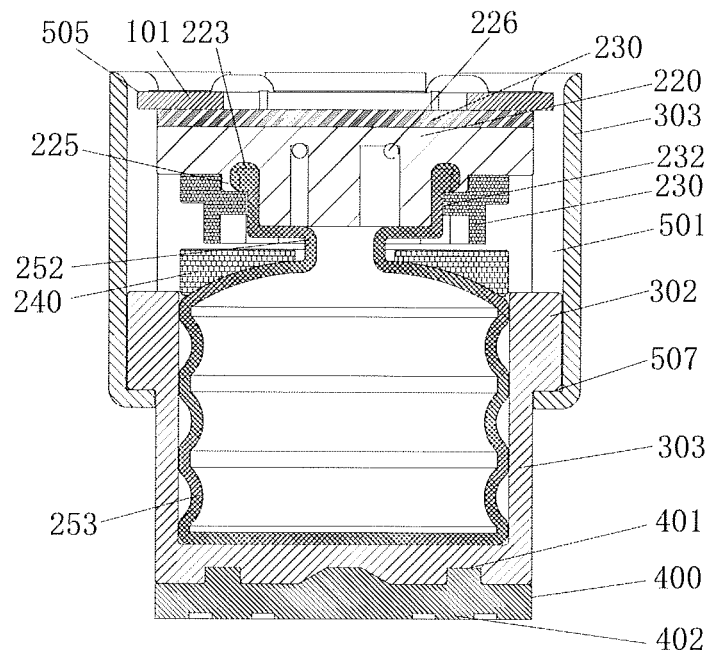
FIG. 5 is a cutaway view of the hydraulic foot of the washing machine according to the embodiment of the present disclosure taken along section A-A in FIG. 4.
Figure 6:
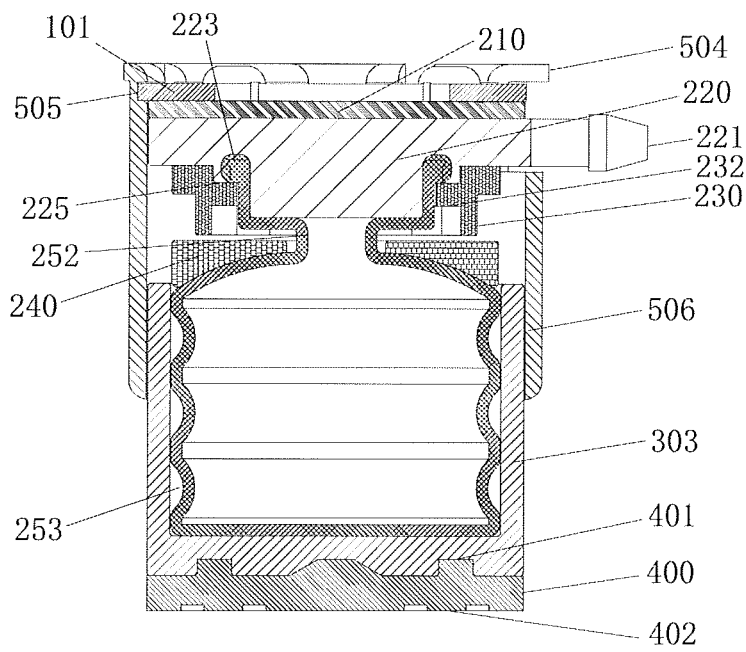
FIG. 6 is a cutaway view of the hydraulic foot of the washing machine according to the embodiment of the present disclosure taken along section B-B in FIG. 4.
Figure 7:
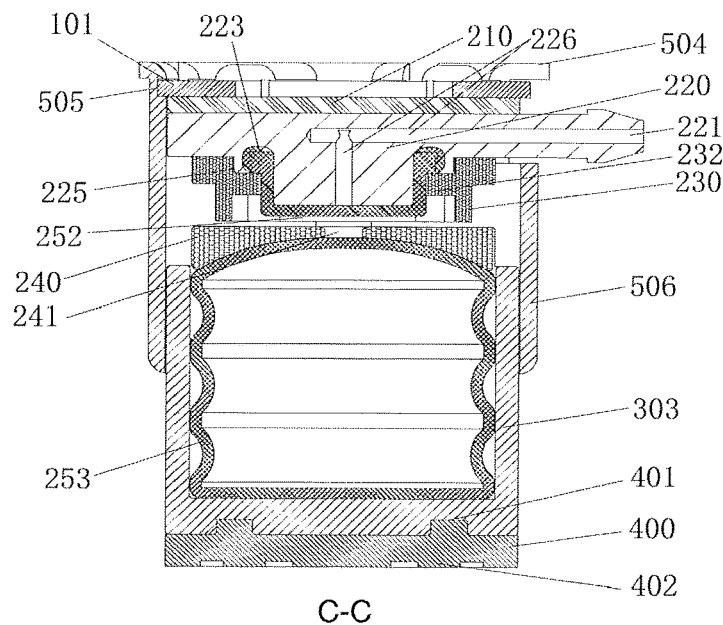
FIG. 7 is a cutaway view of the hydraulic foot of the washing machine according to the embodiment of the present disclosure taken along section C-C in FIG. 4.
Figure 8:
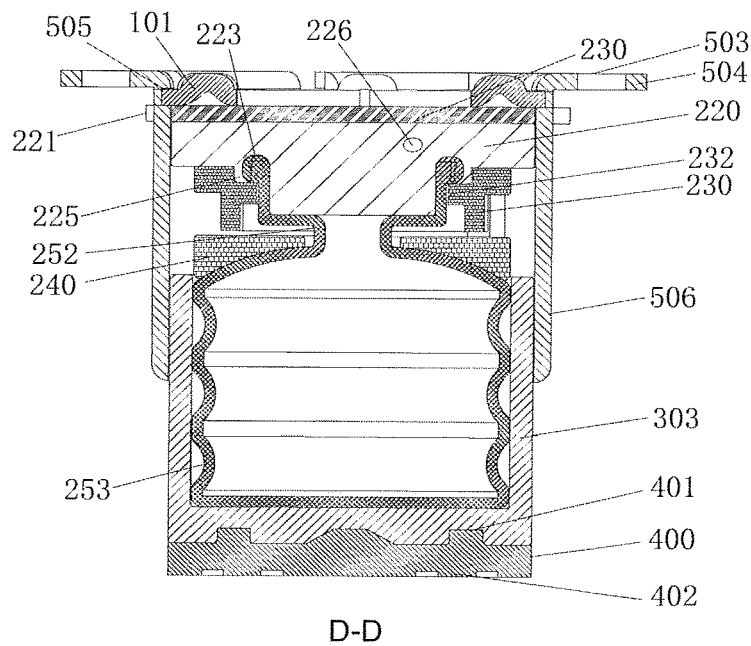
FIG. 8 is a cutaway view of the hydraulic foot of the washing machine according to the embodiment of the present disclosure taken along section D-D in FIG. 4.
Figure 9:
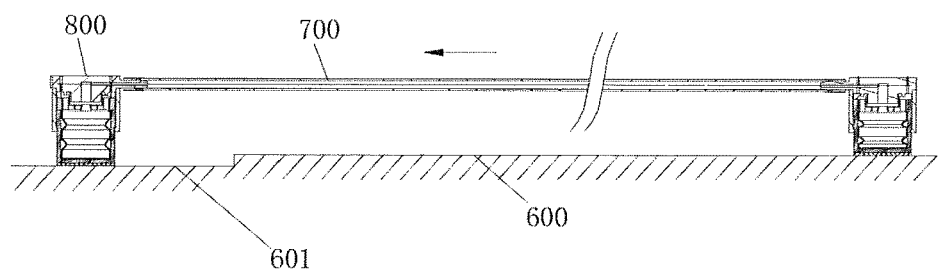
FIG. 9 is a schematic diagram of a leveling principle of hydraulic feet of a washing machine according to an embodiment of the present disclosure.
Figure 10:
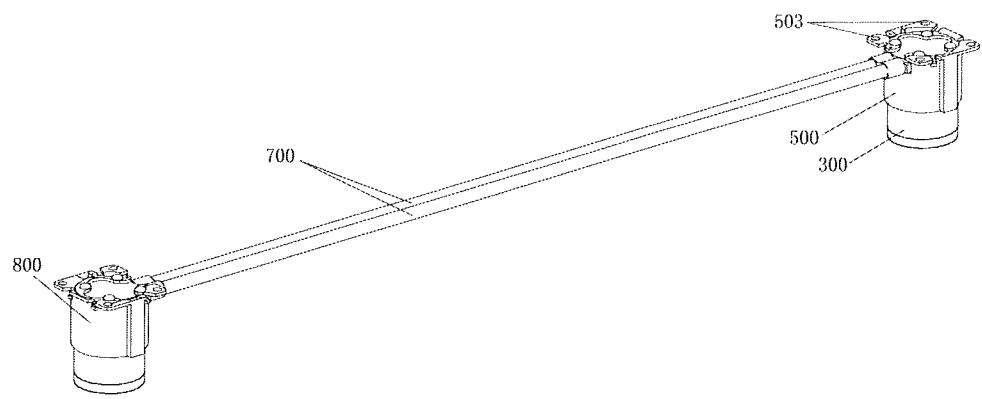
FIG. 10 is a connection structural schematic diagram of hydraulic feet of a washing machine according to an embodiment of the present disclosure.

As shown in FIG. 1 and FIG. 2, in this embodiment, the fixed part of each hydraulic foot 800 is a sheath 500, and the movable part of the hydraulic foot 800 is an adjusting foot 300 arranged in the sheath 500 and moves axially relative to the sheath 500.

The hydraulic foot 800 further comprises a flexible assembly which is arranged in the adjusting foot 300 and is used for accommodating the hydraulic medium, one end of the flexible assembly is mounted in the sheath 500 in a limiting manner, the other end of the flexible assembly is used as a telescopic end acting on the adjusting foot, and the telescopic end extends and retracts under action of the hydraulic medium to drive the adjusting foot 300 to axially move, thereby implementing automatic leveling. The flexible assembly comprises an oil press plate 220 and an oil bag 250, an opening of the oil bag 250 is in sealed connection with the oil press plate 220; and the oil nipples 221 are arranged on the oil press plate 220 and communicate with the oil bag 250.

Figure 23:
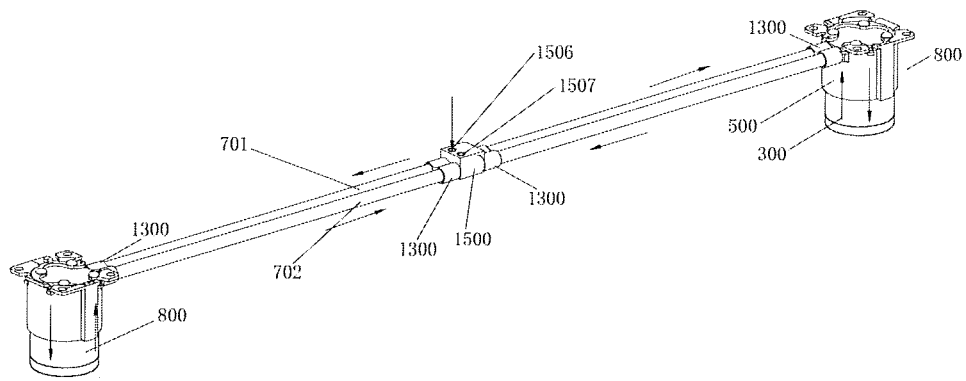
FIG. 23 is a schematic diagram of a filling method for hydraulic feet according to an embodiment of the present disclosure.
Figure 24:
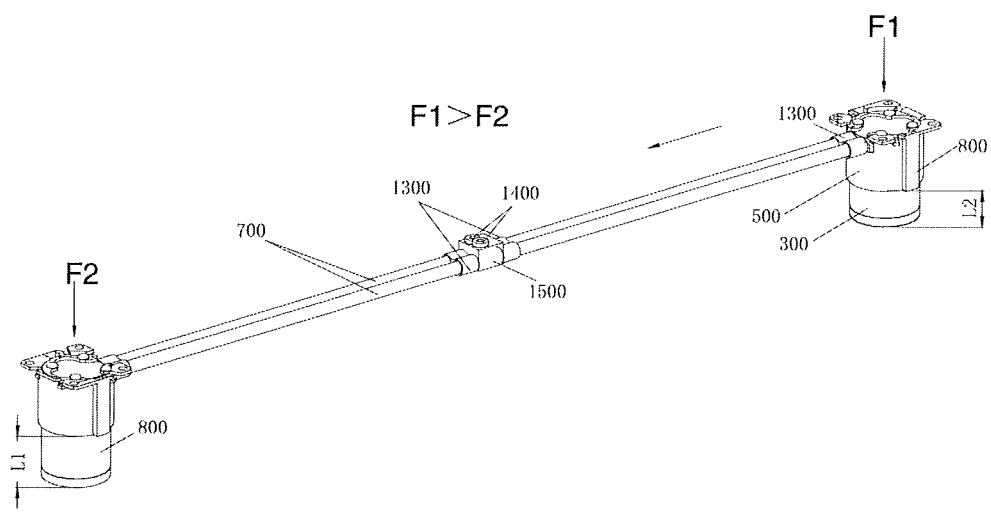
FIG. 24 is a schematic diagram of adjustment of hydraulic feet according to an embodiment of the present disclosure.

As shown in FIG. 23 and FIG. 24, in this embodiment, a filling method of the washing machine hydraulic leveling device described above is provided, which comprises the following steps that:

the oil hole and the vent hole are opened;

an oiling device is connected to the oil hole, and hydraulic oil is injected into the oil hole;

the hydraulic oil flows into the two hydraulic feet through the high-pressure oil pipes from the two connecting oil nipples corresponding to the oil hole, respectively;

the hydraulic oil flows into the other group of high-pressure oil pipes after the two hydraulic feet are filled up with the hydraulic oil, and air in the high-pressure oil pipes and the hydraulic feet is discharged through the vent hole under pressure of the hydraulic oil in a filling process; and the oil hole and the vent hole are closed after the filling is completed.

In this embodiment, the filling method of the washing machine hydraulic leveling device is simple and convenient in operation, and in the filling process, air in the hydraulic feet and the high-pressure oil pipes can be discharged, so that the hydraulic medium is in a vacuum environment, and the hydraulic feet work more stably.

Preferably, a specific oiling device is connected to the oil hole of the connecting piece, a vacuum extraction device is connected to the vent hole, and filling is carried out after the high-pressure oil pipes and the oil bags in the hydraulic feet are vacuumized, so that the filling is more convenient and controllable, and the amount of filled hydraulic oil is more precise.

Embodiment 2

As shown in from FIG. 11 to FIG. 16, in this embodiment, a washing machine with an automatic leveling function is provided. Fixed feet 1000 and hydraulic feet 800 are mounted at the bottom of the washing machine. And at least two fixed feet 1000 and at least one hydraulic foot 800 form a supporting plane for supporting the washing machine; each hydraulic foot 800 comprises a fixed part and a movable part, a hollow chamber is formed between the fixed part and the movable part, and the hollow chamber is provided with a hydraulic medium. The hydraulic medium flows under pressure in the hollow chambers in the hydraulic feet and/or between the hollow chambers in the hydraulic feet to drive the movable parts to extend and retract; and the hydraulic feet 800 cooperate with the fixed feet 1000 to implement automatic leveling.

In this embodiment, the washing machine utilizes a basic principle that three points define one plane, wherein the fixed foot 1000 and the hydraulic foot 800 are mounted at the bottom of the washing machine. At least two fixed feet 1000 define two points, and the hydraulic foot 800 defines another point. Therefore, even if the ground is uneven, the fixed feet 1000 at the bottom of the washing machine closely bear the weight of the washing machine in a line, and the hydraulic foot 800 automatically extends or retracts according to the size of pressure that the hydraulic foot 800 bears, so that the hydraulic foot 800 is an equivalent of a weight bearing point to implement automatic leveling of the washing machine.

Therefore, in this embodiment, according to the washing machine with the automatic leveling function, two types of feet, i.e. the existing fixed feet 1000 (such as bolt feet) and the hydraulic feet 800, are mounted at the bottom, so that the automatic leveling of the washing machine can be implemented. Further, the basic principle that three points define one plane is fully utilized, so that the number of the hydraulic foot 800 to be used is reduced, the mounting mode is simple and convenient, and costs are reduced to a certain extent.

The washing machine generally has a cubic structure, and one foot is generally mounted at each of four corners of the bottom of the washing machine to support the washing machine.

As a preferred implementation mode of the embodiment, two fixed feet 1000 and two hydraulic feet 800 are respectively mounted at the four corners of the bottom of the washing machine, and hollow cavities of the two hydraulic feet 800 communicate with each other through high-pressure oil pipes 700: the hydraulic medium flows under pressure between the hollow chambers of the hydraulic feet 800 to drive the movable parts to extend and retract.

In this embodiment, the washing machine utilizes the basic principle that three points define one plane, wherein the two fixed feet 1000 define two points, and even if the ground is uneven, the two fixed feet 1000 closely bear the weight of the washing machine in a line, and the two hydraulic feet 800 which communicate with each other through the high-pressure oil pipes 700 can automatically extend or retract according to the size of pressure that the two hydraulic feet 800 bear to enable the two points to bear a same pressure intensity, so that the two hydraulic feet 800 are an equivalent of a weight bearing point to implement the automatic leveling of the washing machine.

Further, the washing machine comprises a casing, the casing comprises a base plate 901 for mounting the fixed feet 1000 and the hydraulic feet 800; and each of four corners of the base plate 901 is provided with a mounting hole for correspondingly mounting a fixed foot 1000 or a hydraulic foot 800, or all the four corners of the base plate 901 are provided with mounting holes for correspondingly mounting the fixed feet 1000 and the hydraulic feet 800.

In this embodiment, in order to implement mounting of these two types of supporting feet, i.e. the fixed feet 1000 and the hydraulic feet 800, each of the four corners of the base plate 901 is provided with a mounting hole corresponding to a fixed foot 1000 or a hydraulic foot 800 to be mounted, so that a mounting structure of the base plate 901 can be simplified, and a leveling requirement of the washing machine can be met.

As another implementation mode of this embodiment, all the four corners of the base plate 901 of the washing machine are simultaneously provided with mounting holes for mounting the fixed feet 1000 and the hydraulic feet 800, that is, all the four corners of the base plate 901 are provided with two types of mounting holes, so that a fixed foot 1000 and a hydraulic foot 800 can be mounted at any one corner. The mounting mode of the fixed feet 1000 and the hydraulic feet 800 is more flexible and changeable to meet mounting requirements of the fixed feet 1000 and the hydraulic feet 800 under various use environments.

Specifically, in this embodiment, the fixed feet 1000 are bolt feet, and each bolt foot comprises a bolt rod and a supporter fixed at one end of the bolt rod. In this embodiment, after the fixed feet 1000 are mounted at the base plate of the washing machine, the height of the fixed feet 1000 is constant and cannot be automatically adjusted.

As shown in FIG. 1 and FIG. 2, the fixed part of each hydraulic foot 800 is a sheath 500, the movable part of the hydraulic foot 800 is an adjusting foot 300 arranged in the sheath 500 and can move axially relative to the sheath 500, each hydraulic foot 800 further comprises a flexible assembly which is arranged in the adjusting foot and is used for accommodating the hydraulic medium, one end of the flexible assembly is mounted in the sheath 500 in a limiting manner, and the other end of the flexible assembly is used as a telescopic end acting on the adjusting foot. First mounting holes 902 for mounting the bolt rods and second mounting holes 903 for mounting the sheaths 500 are formed in the base plate 901.

Figure 17:
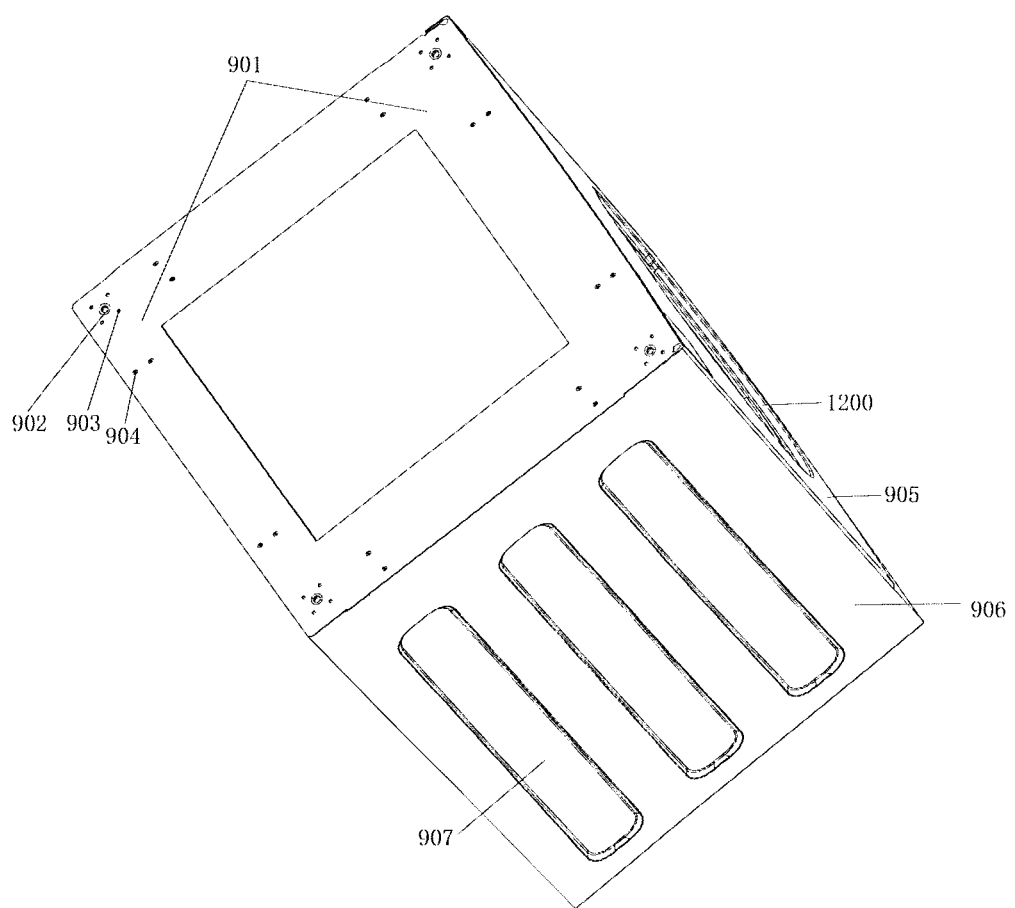
FIG. 17 is a structural schematic diagram of a base plate of a washing machine according to an embodiment of the present disclosure.

As a preferred implementation mode of this embodiment, as shown in FIG. 17, all the four corners of the base plate 901 are provided with both the first mounting holes 902 and the second mounting holes 903, so that each corner of the base plate 901 can be used for mounting any one of the fixed feet 1000 and the hydraulic feet 800, and the combined mounting modes are more flexible and can be selected according to actual use.

Preferably, each corner of the base plate is provided with one first mounting hole 902 and four second mounting holes 903, and the first mounting hole 902 is located at the center of the four second mounting holes 903, so that the two types of mounting holes are arranged according their numbers, and the space of the base plate 901 is better utilized.

More preferably, in this embodiment, a mounting groove for accommodating the high-pressure oil pipes 700 is formed between two corners, at which the hydraulic feet 800 are mounted, of the base plate 901; or a mounting groove for accommodating the high-pressure oil pipes 700 is formed between every two corners of the base plate. In this embodiment, considering that the two hydraulic feet 800 communicate with each other through the high-pressure oil pipes 700, adaptive arrangement is performed for the mounting of the high-pressure oil pipes 700 in order to ensure the stability of the hydraulic feet 800.

As another implementation mode of this embodiment, the high-pressure oil pipes 700 are fixedly mounted on the base plate 901 by bands 1100; third mounting holes 904 for fixing the bands 1100 are formed between two corners, at which the hydraulic feet 800 are mounted, of the base plate 901; or the third mounting holes 904 for fixing the bands 1100 are formed between every two corners of the base plate 901. In the embodiment, the high-pressure oil pipes 700 are fixed on the base plate 901 by the bands 1100, which is simple and convenient and is easy to be implemented.

Figure 11:
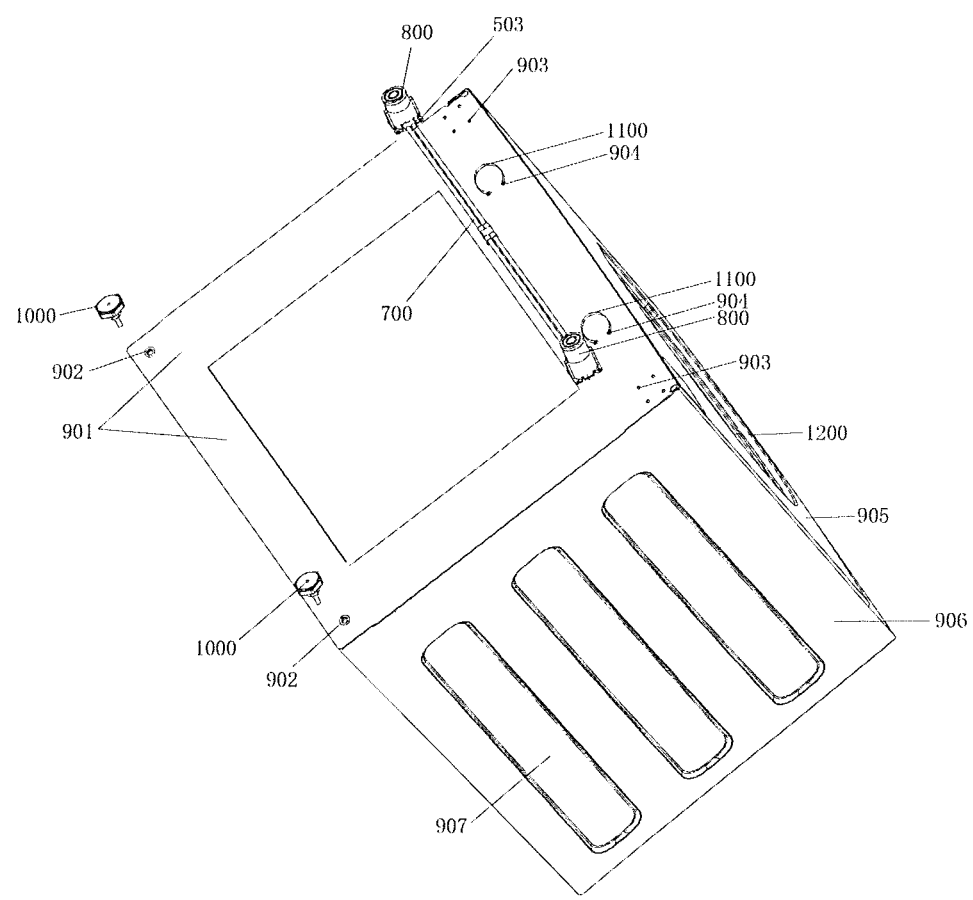
FIG. 11 is a schematic diagram of a first implementation mode for mounting hydraulic feet and fixed feet of a washing machine according to an embodiment of the present disclosure.

As shown in FIG. 11, in this embodiment, the two hydraulic feet 800 are respectively mounted at two corners on a front side of the bottom of the washing machine, the two hydraulic feet 800 communicate with each other through the high-pressure oil pipes 700, and the two fixed feet 1000 are respectively mounted at two corners on a rear side of the bottom of the washing machine.

Figure 12:
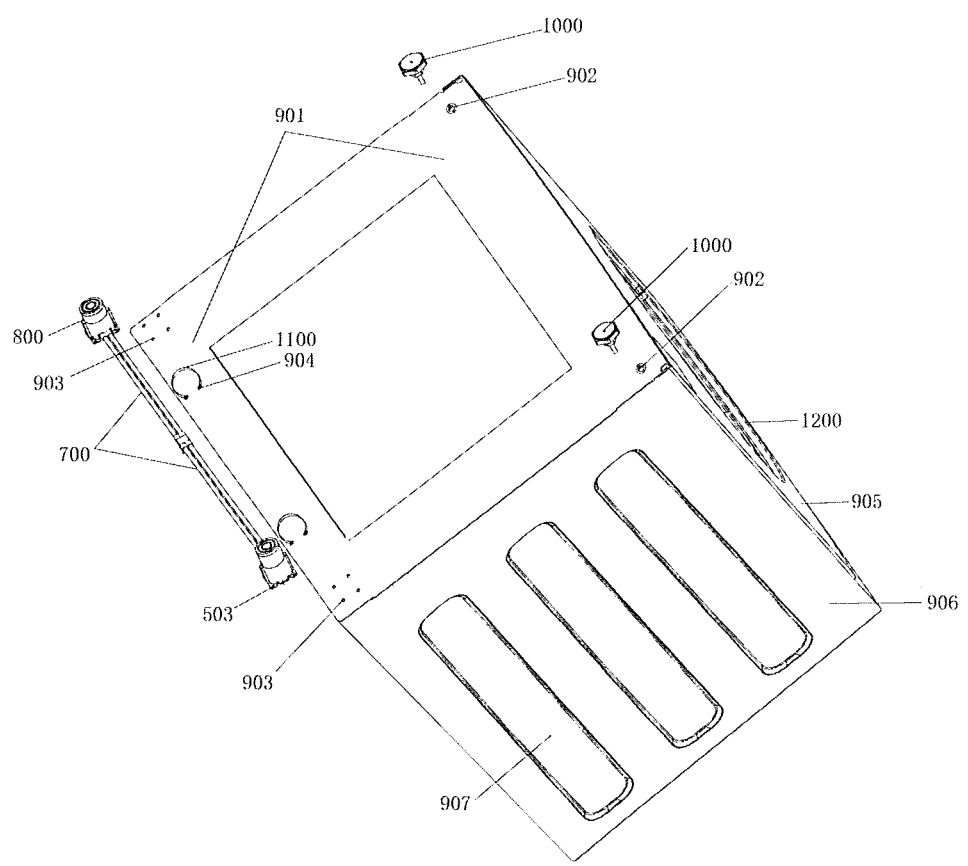
FIG. 12 is a schematic diagram of a second implementation mode for mounting hydraulic feet and fixed feet of a washing machine according to an embodiment of the present disclosure.

As shown in FIG. 12, in this embodiment, the two hydraulic feet 800 are respectively mounted at two corners on the rear side of the bottom of the washing machine, the two hydraulic feet 800 communicate with each other through the high-pressure oil pipes 700, and the two fixed feet 1000 are respectively mounted at two corners on the front side of the bottom of the washing machine.

Figure 13:
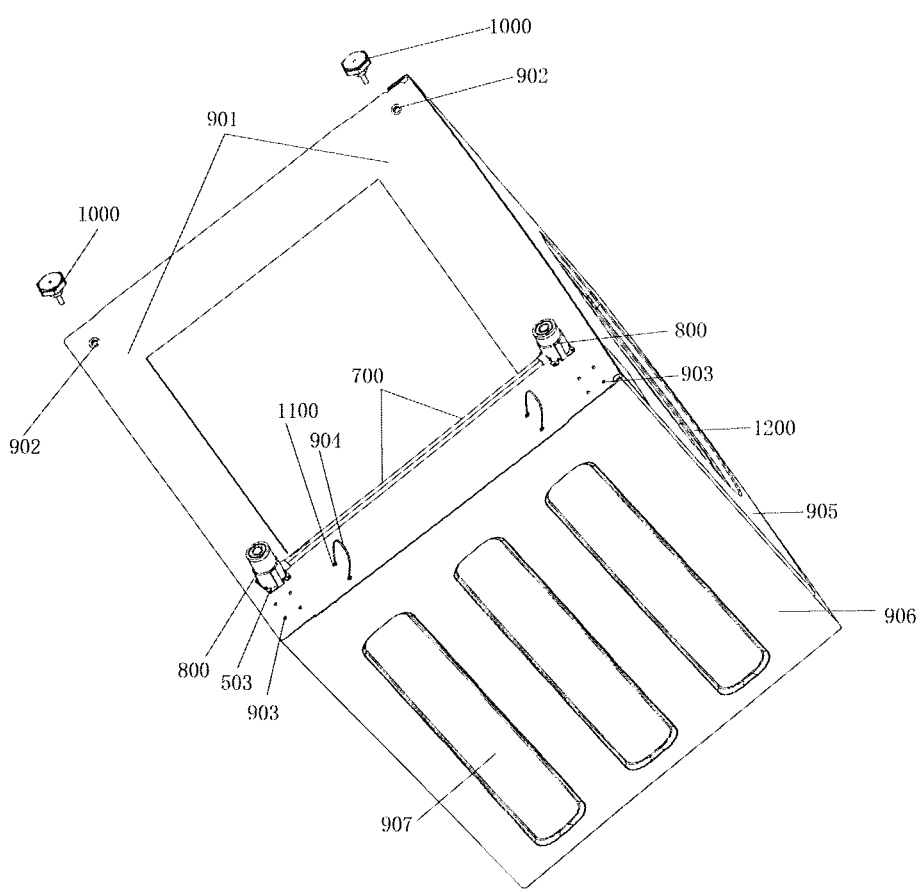
FIG. 13 is a schematic diagram of a third implementation mode for mounting hydraulic feet and fixed feet of a washing machine according to an embodiment of the present disclosure.

As shown in FIG. 13, in this embodiment, the two hydraulic feet 800 are respectively mounted at two corners on a left side of the bottom of the washing machine, the two hydraulic feet 800 communicate with each other through the high-pressure oil pipes 700, and the two fixed feet 1000 are respectively mounted at two corners on a right side of the bottom of the washing machine.

Figure 14:
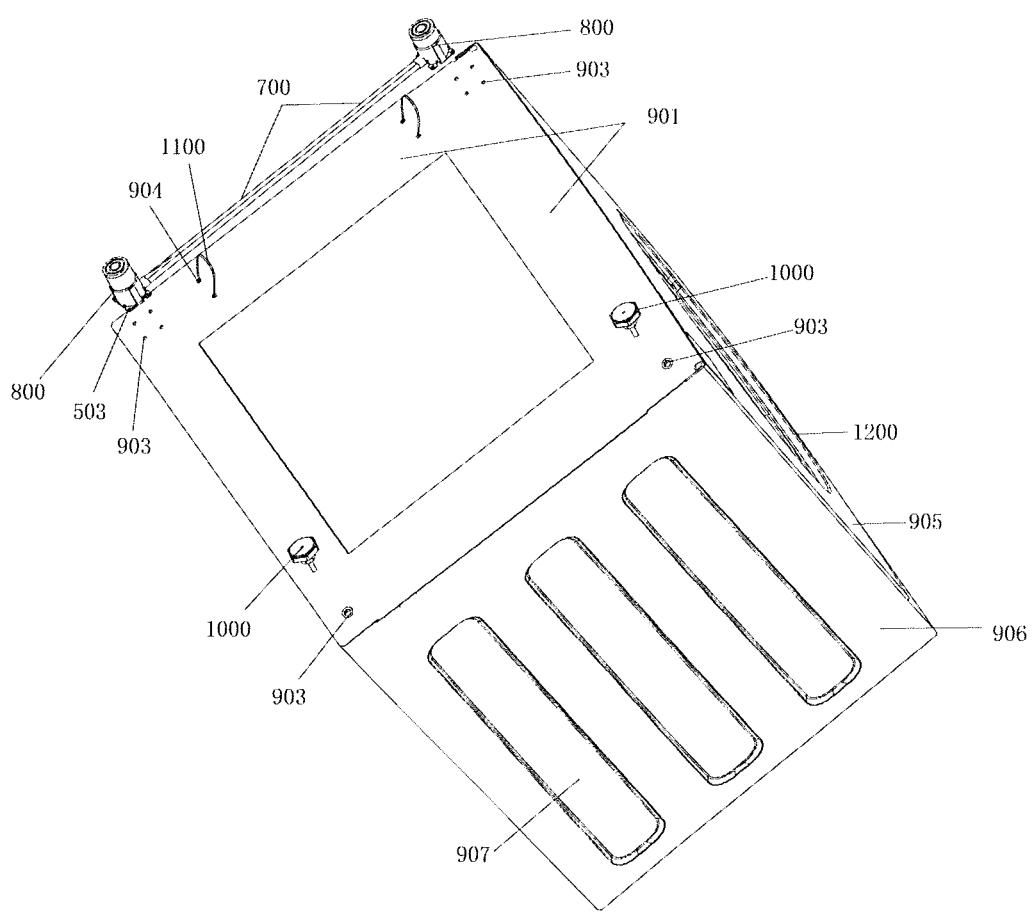
FIG. 14 is a schematic diagram of a fourth implementation mode for mounting hydraulic feet and fixed feet of a washing machine according to an embodiment of the present disclosure.

As shown in FIG. 14, in this embodiment, the two hydraulic feet 800 are respectively mounted at two corners on a right side of the bottom of the washing machine, the two hydraulic feet 800 communicate with each other through the high-pressure oil pipes 700, and the two fixed feet 1000 are respectively mounted at two corners on a left side of the bottom of the washing machine.

Figure 15:
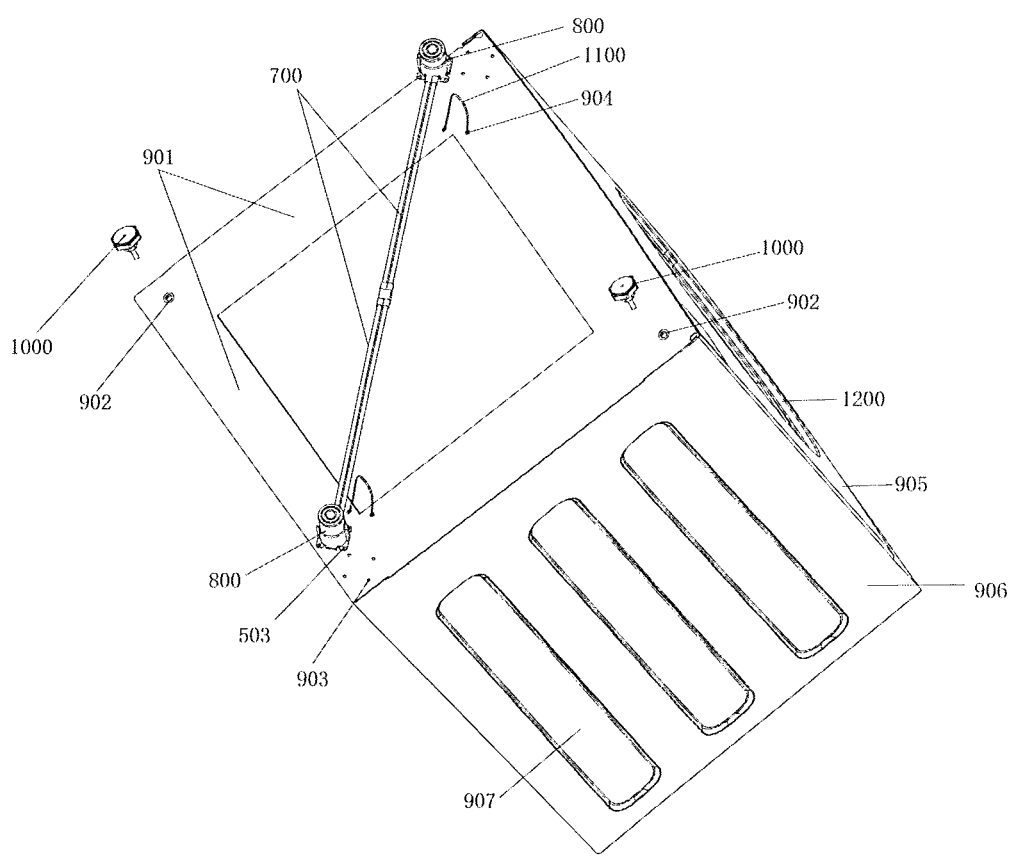
FIG. 15 is a schematic diagram of a fifth implementation mode for mounting hydraulic feet and fixed feet of a washing machine according to an embodiment of the present disclosure.
Figure 16:
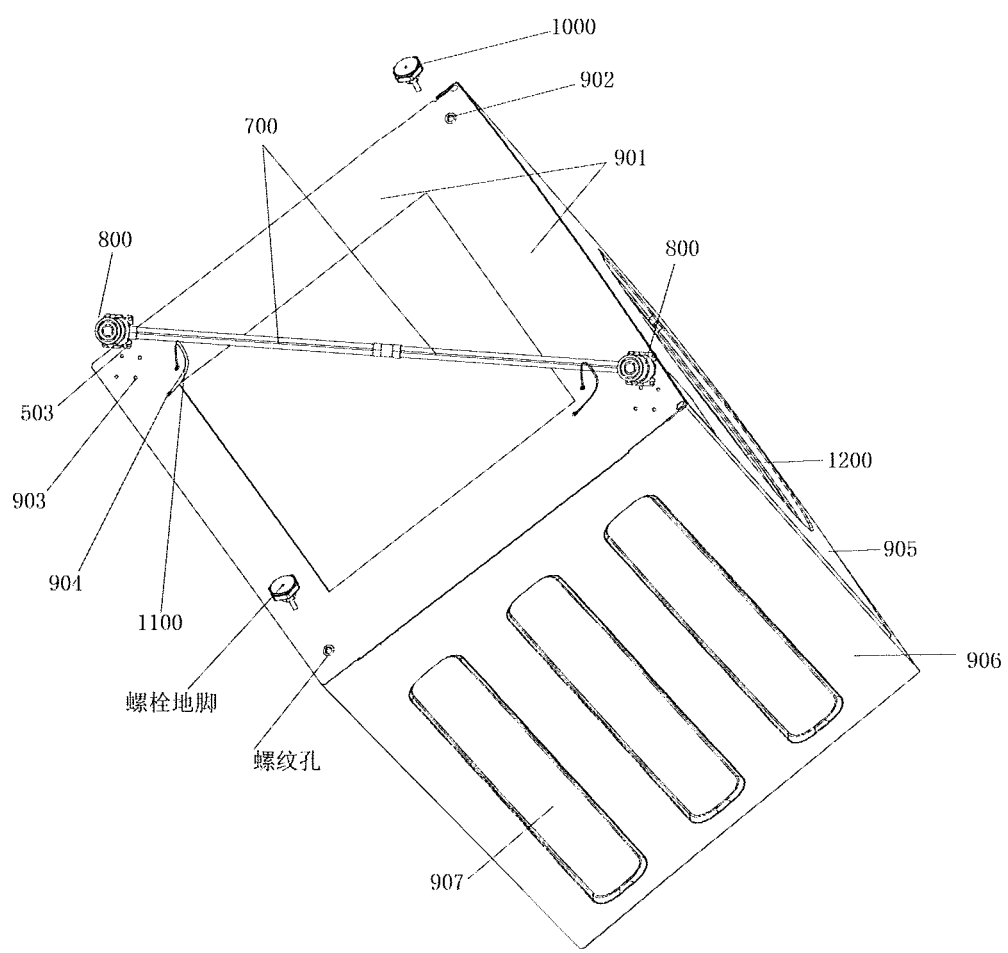
FIG. 16 is a schematic diagram of a sixth implementation mode for mounting hydraulic feet and fixed feet of a washing machine according to an embodiment of the present disclosure.

As shown in FIG. 15 and FIG. 16, in this embodiment, the two hydraulic feet 800 are respectively mounted at two diagonal corners of the bottom of the washing machine, and the two fixed feet 1000 are respectively mounted at the other two diagonal corners of the bottom of the washing machine.

In this embodiment, the casing of the washing machine is used as a retaining cage and an appearance of the whole washing machine. The casing comprises a front panel 905, a back panel opposite to the front panel 905 and side panels 906 located on two sides of the front panel 905. A window 1200 is mounted on the front panel 905, and the side panel 906 has reinforcing press profiles 907 for reinforcing the integral intensity.

Embodiment 3

As shown in FIG. 1 to FIG. 8, in this embodiment, a hydraulic foot comprises:

a sheath 500; an adjusting foot 300, which is arranged in the sheath 500 and can move axially relative to the sheath 500; and a flexible assembly 200, which is arranged in the adjusting foot 300 and is used for accommodating a hydraulic medium, wherein one end of the flexible assembly 200 is mounted in the sheath 500 in a limiting manner, and the other end of the flexible assembly 200 is used as a telescopic end acting on the adjusting foot 300; and the telescopic end of the flexible assembly 200 extends and retracts under action of the hydraulic medium to drive the adjusting foot 300 to axially move, thereby implementing automatic leveling.

In this embodiment, hydraulic feet are respectively arranged at four corners of a base plate of the washing machine, or at least four hydraulic feet are uniformly arranged in a circumference direction of the base plate, and at least two of the hydraulic feet communicate with each other. When the ground, where the washing machine is placed, is uneven, stress on each hydraulic foot is different, the hydraulic medium in the communicating hydraulic feet flows from a hydraulic foot under a larger stress to another hydraulic foot under a smaller stress, and as the hydraulic medium flows, the flexible assemblies 200 extend and retract to drive the adjusting feet 300 to axially move, thereby implementing the automatic leveling.

In this embodiment, the hydraulic feet communicate with each other, so that the hydraulic medium inside the hydraulic feet flows between the hydraulic feet. When one of the hydraulic feet is compressed under pressure, the hydraulic medium flows into the other hydraulic foot communicating with the afore-mentioned hydraulic foot, the amount of the hydraulic medium in the other hydraulic foot is increased, and an increase of pressure drives the other hydraulic foot to extend out, thereby ensuring a sufficient supporting force.

In this embodiment, in the hydraulic foot with an automatic leveling function, the flexible assembly 200 is mounted in the sheath 500 in a limiting manner in order to prevent the flexible assembly 200 from being damaged, so that working stability of the flexible assembly 200 can be ensured.

Further, in the embodiment, the hydraulic foot with the automatic leveling function has a high assembly efficiency and is simple and convenient, and a stress part (such as the sheath 500) can be made of sheet metal, or manufactured by zinc alloy casting, or manufactured by injection molding from high-performance engineering plastic, such as PPS, PI, PEEK and the like, so that the stress part has high reliability.

In this embodiment, the hydraulic foot with the automatic leveling function provides an optimal structure, which is simple to be assembled, is convenient to be mounted, and prevents the flexible assembly 200 from being damaged as possible, thereby ensuring the overall stability of the hydraulic foot and prolonging the service life.

Specifically, in this embodiment, the sheath 500 comprises a sheath body 506 with a hollow passage, the adjusting foot 300 can be arranged in the hollow passage of the sheath body 506 in an axially slidable manner, one end of the adjusting foot 300 extends out of the hollow passage of the sheath body 506 and comes into contact with the ground, and the adjusting foot 300 can axially slide under action of the hydraulic medium according to the height of the ground to implement automatic leveling.

In this embodiment, one end of the sheath body 506 is opened, and extends towards an outer side of the hollow passage and turns as a flange to form a sheath plane 504, and the sheath plane 504 fits to the base plate of the washing machine and is fixedly connected with the base plate through connectors. In this embodiment, the sheath body 506 is fixedly mounted on the base plate of the washing machine through the sheath plane 504, and the flexible assembly 200 is arranged in the sheath body 500, so that the sheath 500 and the base plate interact with each other, and the flexible assembly 200 does not bear an acting force of the washing machine and extends and retracts only under the action of the hydraulic medium, so that working stability is ensured.

In this embodiment, the sheath body 506 has a cylinder structure, has a certain length to match with the adjusting foot 300, and at least covers a part of the adjusting foot 300.

In this embodiment, the upper part of the sheath body 506 has a one-piece pressing formed flanging structure to form the sheath plane 504. Sheath fixing holes 503 are formed in the sheath plane 504 so as to firmly fix the sheath 500 and even the whole hydraulic foot onto the base plate of the washing machine through screws or bolts.

Preferably, in this embodiment, the sheath 500 can be manufactured by plastic one-piece injection molding, aluminum alloy die casting, etc., preferably sheet metal pressing.

In this embodiment, the flexible assembly 200 comprises an oil press plate 220, a press plate 230 and an oil bag 250, and an opening of the oil bag 250 is in sealed connection with a lower wall of the oil press plate 220 through the press plate 230.

In this embodiment, oil nipples 221 are arranged on one side of the oil press plate 220, oil holes 224 for the hydraulic medium in the oil bag 250 to flow into are formed in the lower wall of the oil press plate 220, and oil passages 226 for communicating the oil nipples 221 with the oil holes 224 are formed in the oil press plate 220.

In this embodiment, the oil press plate 220 is mounted at one end of the sheath plane 504 of the sheath body 506 in a limiting manner, and the oil bag 205 is arranged in the sheath 500 and comes into contact with an inner wall of the sheath 500.

In this embodiment, the oil press plate 220 is a component manufactured by one-piece injection molding or die-casting molding, and at least two oil nipples 221 are arranged on the oil press plate 220 and are used for communicating the hydraulic feet, so that the hydraulic medium flows between the hydraulic feet.

In this embodiment, the oil holes 224 are formed in the center of the oil press plate 220, and the oil passages 226 are formed in the oil press plate 220 to ensure that the hydraulic medium in the oil bag 250 can flow to the oil nipples 221 through the oil passages 226 from the oil holes 24, thereby implementing free flowing of the hydraulic medium of the multiple hydraulic feet according to the size of pressure, and implementing the automatic leveling.

In this embodiment, the oil bag 250 is provided with the hydraulic medium, the oil press plate 220 is used for sealing the hydraulic medium in the oil bag 250 and enabling the hydraulic medium in the oil bag 250 to flow in/out through the oil nipples 221 of the oil press plate 220, and the press plate 230 is used for ensuring a sealed connection between the opening of the oil bag 250 and the oil press plate 220 to avoid leakage of the hydraulic medium.

In this embodiment, the oil bag 250 of the flexible assembly 200 is a stretchable structure made from a flexible material, and preferably the flexible material has elasticity and can restore from deformation. Additionally, the oil press plate 220 is a component manufactured by one-piece injecting molding or die-casting molding, therefore, as long as the oil press plate 220 is mounted in the sheath body 506 in a limiting manner, limiting mounting of the flexible assembly 200 can be implemented.

In this embodiment, in order to implement the limiting mounting of the flexible assembly 200, it mainly needs to limit a circumferential rotation movement and an axial vertical fluctuation of the flexible assembly 200. In order to limit the circumferential rotation movement of the flexible assembly 200, specifically:

in this embodiment, the flexible assembly 200 further comprises a limiting plate 210, the limiting plate 210 comprises a plurality of protruded limiting claws 211, and limiting grooves 502 matching with the limiting claws 211 to implement limiting are formed in the sheath body 506; and the limiting plate 210, the oil press plate 220 and the press plate 230 are fixedly connected to limit the circumferential rotation of the flexible assembly 200 in the adjusting foot 300.

In this embodiment, the flexible assembly 200 cooperates with the limiting grooves 502 of the sheath body 506 through the limiting claws 211 of the limiting plate 210, so that the flexible assembly 200 cannot carry out the circumferential rotation.

In this embodiment, the number of the limiting claws 211 of the limiting plate 210 is plural and is set according to the specific structure and the mounting of the oil press plate 220.

Specifically, an opening for allowing extension of the oil nipples 221 of the oil press plate 220 is formed in the sheath body 506, so that a position where the opening is located should be taken into consideration to be avoided in order to ensure the limiting mounting when the limiting claws 211 are arranged.

In this embodiment, limiting plate mounting holes 212 are formed in the limiting plate 210, oil press plate mounting holes 222 are formed in the oil press plate 220, press plate mounting holes 231 are formed in the press plate 230, and the press plate 230, the oil press plate 220 and the limiting plate 210 can be tightly fixed together through screws or bolts.

In this embodiment, the sheath 500 is mounted on the base plate of the washing machine, the oil press plate 220 is fastened to the limiting plate 210, the upper part and the lower part of the limiting plate 210 are both limited, the lower part of the limiting plate 210 is lowest ends of the limiting grooves 502 of the sheath 500, and the limiting claws 211 and the limiting grooves 502 at least provide stress supporting points for the limiting plate 210 in the circumference direction, that is, the limiting claws 211 and the limiting grooves 502 are distributed in the circumference direction as uniform as possible.

Preferably, the limiting plate 210 is manufactured by sheet metal pressing, which is simple and low in cost.

In this embodiment, in order to limit the circumferential rotation movement of the flexible assembly 200, the hydraulic foot specifically further comprises:

an axial limiting device 100, wherein the axial limiting device 100 is arranged in the sheath 500, one side of the axial limiting device 100 is limited by the base plate of the washing machine, and the other side acts on the flexible assembly 200 and is used for limiting the axial movement of the flexible assembly 200.

In this embodiment, the axial movement of the flexible assembly 200 is limited by the axial limiting device, thereby ensuring that the flexible assembly 200 stably works.

As a preferred implementation mode of this embodiment, the axial limiting device is an annular circlip 101 with a gap, a ring groove 505 is formed in an inner wall of the sheath 500, and the circlip 101 is clamped in the ring groove 505 and is located on the limiting plate 210 of the flexible assembly 200. The use of the circlip 101 provides simplicity and convenience in mounting and detaching, and costs are low. The ring groove 505 formed in the inner wall of the sheath 500 can effectively limit the circlip 101 to ensure mounting stability of the circlip 101.

In this embodiment, the ring groove 505 is formed in the inner circumference of the sheath 500, and can be manufactured by pressing, preferably machining. After the limiting plate 210 is mounted in the sheath 200, the circlip 101 is mounted in the upper part. After the circlip 101 is mounted, the limiting plate 210 does not move up and down.

Further, in this embodiment, limiting bulges 102 are arranged on the upper surface of the circlip 101 in a protrusion manner, the bulges 102 can further exert an axial limiting function when the circlip 101 has axial fluctuation. The circlip 01 is under a uniform stress due to the limiting bulges 102.

Further, in this embodiment, holes 103 for allowing operations of a tool are formed in the circlip 101. The holes 103 in the circlip 101 facilitate mounting by the tool.

In this embodiment, the oil bag 250 comprises a stretchable corrugated structure 253, a throttling narrow neck 252 and an opening 251, the throttling narrow neck 252 communicate with the corrugated structure 253, and the opening 251 is located at an end of the throttling narrow neck 252.

The flexible assembly 200 further comprises an upper protection ring 240, a mounting hole 241 for the throttling narrow neck 252 to pass is formed in the center of the upper protection ring 240, a mounting groove 242 is formed in the upper protection ring 240, one end of the mounting groove 242 is opened and penetrates through the mounting hole 241, and the other end of the mounting groove 242 is opened in a side wall of the upper protection ring 240.

The throttling narrow neck 252 goes into the mounting hole 241 through the mounting groove 242. A lower surface of the upper protection ring 240 has a fitting surface matching with the oil bag 250 in order to prevent the upper part of the oil bag 250 from being extruded and broken under a high pressure.

The mounting hole 241 is formed in the center of the upper protection ring 240, the mounting groove 242 is also formed in the upper protection ring 240, and the exterior of the mounting groove 242 has a chamfer structure 243, so that the throttling narrow neck 252 of the oil bag 250 is easier to be mounted in the mounting hole 241 of the upper protection ring.

The mounting hole 241 can ensure the intensity of the throttling narrow neck 252, avoids breakage, prevents the throttling narrow neck 252 from deforming, and ensures that the throttling narrow neck 252 of the oil bag 250 is always opened, thereby ensuring the effectiveness of the hydraulic foot.

A part, in contact with the oil bag, of the upper protection ring has a consistent shape with the oil bag.

A cavity structure defined by the upper protection ring and the adjusting foot forms a relatively sealed space, and the inside oil bag is protected by the both components, so that the breakage and damage of the oil bag are effectively prevented.

The oil bag 250 comprises the opening 251, the throttling narrow neck 252 and the corrugated structure 253, the oil bag 250 internally accommodates the hydraulic medium, and preferably, the hydraulic medium is hydraulic oil.

The oil bag 250 is made from an oil-proof elastomer material, such as nitrile rubber, acrylate rubber, silicone and the like.

The oil bag 250 is in an up-and-down compression and extension working state, and in order to improve the reliability and prolong the service life, the main body of the oil bag 250 is provided with the corrugated structure 253.

The oil bag 250 fits to a space of the adjusting foot 300 and a space of the upper protection ring 240, and only has a certain interval at a position of the corrugated structure 253.

According to the hydraulic foot of this embodiment, mounting of the flexible assembly 200 is limited to avoid instability caused by rotation of the hydraulic foot in an automatic leveling process. Therefore, further, according to the hydraulic foot of this embodiment the movement of the adjusting foot is also limited. The adjusting foot only moves up and down and does not rotate, thereby ensuring the stability of the leveling process. Specifically:

in this embodiment, guide limiting grooves 501 are formed in the inner wall of the sheath 500, guide limiting blocks 302 are arranged on an outer wall of the adjusting foot 300, and the guide limiting blocks 302 are limited in the guide limiting grooves 501 and axially slide along the guide limiting grooves 501.

The sheath 500 has the guide limiting grooves 501 so as to limit the adjusting foot 300 only to move up and down inside and not to rotate circumferentially, thereby preventing rotation of the adjusting foot 300 in the sheath 500. The bottom of each guide limiting groove 501 is provided with a stopping part 507, and the stopping parts 507 match with the corresponding guide limiting blocks 302 protruding from the circumference of the adjusting foot 300, thereby preventing the adjusting foot 300 from dropping out of the sheath 500.

In this embodiment, an elastic washer 400 is arranged on the outer side of a bottom wall of the sheath 500, reinforcing fitting grooves are formed in the bottom wall of the sheath 500, reinforcing fitting ribs 401 matching with the reinforcing fitting grooves are arranged on an upper surface of the elastic washer 400, and a lower surface of the elastic washer 400 is partially recessed to form a damping rib 402.

Preferably, the elastic washer 400 is a rubber washer. In order to reinforce connection intensity between the adjusting foot 300 and the rubber washer, the reinforcing fitting grooves are formed in the bottom of the adjusting foot 300, the rubber washer has the reinforcing fitting ribs 401, and preferably, the rubber washer is integrally injection-molded on the adjusting foot 300. Preferably some recessed patterns are arranged at a part, in contact with the ground, of the rubber washer to form the damping rib 402 to improve friction damping between the foot and the ground and prevent the washing machine from generating displacement caused by vibration.

In this embodiment, an assembling method for the hydraulic foot is further provided, which comprises the following steps that:

the sheath 500 being used as a reference;

1) the adjusting foot 300 with the rubber washer is put into the sheath 500 through the opening of the upper end of the sheath 500;

it should be noted that the guide limiting blocks 302 of the adjusting foot 300 must match with the guide limiting grooves 501 of the sheath 500;

2) the throttling narrow neck 252 of the oil bag 250 is mounted in the upper protection ring 240, the opening of the oil bag 250 receives a protrusion part of the oil press plate 220 and is placed in the sealing groove 223, the press plate 230 presses the opening of the oil bag 250, and screws or bolts penetrate through the limiting plate mounting holes 212, the oil press plate mounting holes 222 and the press plate mounting holes 231, so that the oil bag 250, the upper protection ring 240, the press plate 230, the oil press plate 220 and the limiting plate 210 form the flexible assembly 200; and the flexible assembly 200 is placed in the hollow chamber 301 of the adjusting foot 300;

3) the limiting plate 210 of the flexible assembly 200 is mounted in the sheath 500, the lower part of the limiting plate 210 is limited by the limiting grooves 502, and the circumference of the limiting plate 210 is limited by the limiting claws 211 and the limiting grooves 502; and 4) the circlip 101 is placed in the ring groove 505 of the sheath 500, and at this point, the flexible assembly 200 does not move relative to the sheath 500 in the vertical direction and the circumference direction, so that the flexible assembly 200 and the sheath 500 are fixed together.

The assembly of the hydraulic foot is completed, and the assembly has high efficiency and is simple and convenient, and the stress components are all made of sheet metals, thereby having high reliability.

In this embodiment, a washing machine comprising the above hydraulic feet with the automatic leveling function is also provided. The washing machine comprises a casing, a plurality of the hydraulic feet are mounted at the bottom of the casing, and the hydraulic medium filling the inside of the hydraulic feet flows between the hydraulic feet to implement leveling.

In this embodiment, a preferred factory setting of the washing machine is that: the four hydraulic feet have consistent heights; if the washing machine is randomly placed on an uneven ground, the four hydraulic feet bear different pressures according to uneven conditions of the bottom, and then lengths of the adjusting feet pressed into the sheaths are different, so that the automatic leveling of the washing machine is implemented.

The above embodiments should be further described as follows.

1. In the embodiments of the present disclosure, the feet communicate with each other in a pairwise manner, the number (N is larger than or equal to 2) of the feet may be three or more, preferably two, and when the number of the feet is two, the lowest cost and better effects can be achieved.

In the embodiments of the present disclosure, four ports of a communication device 15 are respectively connected with the four feet, and it can be deduced that if a communication device 15 which has three, five, six and N ports is used, the ports of the communication device 15 are respectively connected with three, five, six and N feet. The above-mentioned embodiments merely describe that a most suitable number of the ports is four under the condition that the function is implemented so as to control the costs to be the lowest.

2. In the embodiments of the present disclosure, by taking a drum washing machine for example, the principle and the method for implementing the automatic leveling of the drum washing machine are explained, and it is easy to be associated that the present disclosure can be applied to vertical automatic washing machines.

3. In the embodiments of the present disclosure, by taking a washing machine for example, the principle and the method for implementing the automatic leveling of the washing machine are explained, and it is easy to be associated that the present disclosure can be applied to household appliances, such as refrigerators, freezers, dish washing machines and the like.

FIG. 13 specifically describes the leveling principle. When the washing machine is mounted, uneven ground 600 causes different horizontal heights of the different hydraulic feet 800, and a hydraulic foot 800 located at a ground recess 601 is located at a low place. It can be known that a hydraulic foot 800 at a high place firstly bears the weight of the washing machine and bear a large part of the weight, and the hydraulic foot 800 at a low place becomes a weak leg or bears a small part of the weight.

The adjusting foot 300 of the hydraulic foot 800 at the higher place moves upwards under a large pressure, so that the height of the whole hydraulic foot at the higher place is reduced, the volume of the hollow chamber of the oil bag 250 filled up with the hydraulic oil is compressed and reduced, the hydraulic oil is forced to enter a throttling hole or a valve hole and then to enter the hydraulic foot at the low place through the high-pressure oil pipes 700, the oil bag 250 of the hydraulic foot at the low place has more and more hydraulic oil, and then the oil bag 250 expands to push the adjusting foot 300 to extend.

When the hydraulic foot at the high place and the hydraulic foot at the low place have the same hydraulic pressure, the hydraulic oil does not flow in the high-pressure oil pipes 700, relative positions of the adjusting feet and the base plate of the washing machine are not changed, and automatic adjustment of the hydraulic feet is completed.

In a washing machine washing or drying process, the hydraulic oil further can slowly flow to carry out the automatic leveling, so that vibration noise of the washing machine is largely reduced.

In the embodiments, the height-pressure oil pipes 700 are connected with the oil nipples 221 of the hydraulic feet 800.

What described above are only preferred embodiments of the present disclosure, but are not intended to limiting the scope of the present disclosure in any forms. Although the present disclosure has been disclosed in terms of preferred embodiments, it is not limited thereto. Without departing from the scope of the technical solution of the present disclosure, any persons skilled in the present disclosure can make equivalent embodiments with various alterations and modifications as equivalent variations by utilizing the above-mentioned technical contents. However, without departing from the contents of the technical solution of the present disclosure, any simple changes, equivalent variations and modifications made according to the technical essence of the present disclosure shall all be covered within the scope of the technical solution of the present disclosure.

The invention claimed is:

1. A washing machine hydraulic leveling device, comprising:
    a plurality of hydraulic feet, wherein each hydraulic foot comprises a fixed part and a movable part, a hollow chamber is formed between the fixed part and the movable part, and the hollow chamber is provided with a hydraulic medium;
    two hydraulic feet of the plurality of hydraulic feet communicate with each other through an oil pipe, the hydraulic medium flows under pressure between the hollow chambers of the hydraulic feet to drive the movable parts to extend and retract, thereby implementing automatic leveling; and
    each fixed part is provided with an oil nipple communicating with the respective hollow chamber, and the oil nipples of the two hydraulic feet are connected to a same connecting piece through the oil pipe, thereby implementing communication between the two hydraulic feet; wherein
    the connecting piece includes a main cavity, the main cavity is internally provided with two flow channels, an oil hole and a vent hole are formed in the main cavity corresponding to the two flow channels respectively, and a sealing member is mounted on each of the oil hole and the vent hole.

2. The washing machine hydraulic leveling device according to claim 1, wherein,
    each hydraulic foot comprises two oil nipples, the connecting piece comprises four connecting oil nipples which communicate with each other in a pairwise manner, and each two connecting oil nipples communicating with each other communicate with the oil nipples of the two hydraulic feet through the oil pipes, respectively.

3. The washing machine hydraulic leveling device according to claim 2, wherein, each of two ends of the main cavity is provided with two connecting oil nipples, and
    the two flow channels inside the main cavity communicate the four connecting oil nipples at the two ends of the main cavity with each other in a pairwise manner.

4. The washing machine hydraulic leveling device according to claim 1, wherein, each sealing member comprises a sealing bolt and a sealing gasket, the oil hole and the vent hole are both sealing screw holes matching with the sealing bolts, and the sealing gaskets are mounted between the sealing bolts and the sealing screw holes.

5. A washing machine hydraulic leveling device, comprising:
    a plurality of hydraulic feet, wherein each hydraulic foot comprises a fixed part and a movable part, a hollow chamber is formed between the fixed part and the movable part, and the hollow chamber is provided with a hydraulic medium:
    two hydraulic feet of the plurality of hydraulic feet communicate with each other through an oil pipe, the hydraulic medium flows under pressure between the hollow chambers of the hydraulic feet to drive the movable parts to extend and retract, thereby implementing automatic leveling; and
    each fixed part is provided with an oil nipple communicating with the respective hollow chamber, and the oil nipples of the two hydraulic feet are connected to a same connecting piece through the oil pipe, thereby implementing communication between the two hydraulic feet; wherein
    each hydraulic foot includes two oil nipples, the connecting piece comprises four connecting oil nipples which communicate with each other in a pairwise manner, and each two connecting oil nipples communicating with each other communicate with the oil nipples of the two hydraulic feet through the oil pipes, respectively;
    the oil pipe and the oil nipple of each hydraulic foot are in sealed connection through a clamping piece, and the oil pipe and the connecting oil nipples of the connecting piece are in sealed connection through the clamping piece.

6. The washing machine hydraulic leveling device according to claim 5, wherein, the clamping piece is a hoop, and the hoop comprises two clamping sleeves which are sleeved on the oil pipes, and a connecting part which connects the two clamping sleeves.

7. The washing machine hydraulic leveling device according to claim 1, wherein, the oil nipple of each hydraulic foot and the connecting oil nipples of the connecting piece each comprises a chamfer part which is located at an end of each nipple to enable the oil pipe to be easily inserted into, and a barb part which is located behind the chamfer part and used for preventing the oil pipe from dropping out.

8. The washing machine hydraulic leveling device according to claim 1, wherein,
    the fixed part of each hydraulic foot is a sheath, and the movable part of each hydraulic foot is an adjusting foot arranged in the sheath and moves axially relative to the sheath;
    each hydraulic foot comprises a flexible assembly which is arranged in the adjusting foot and is used for accommodating the hydraulic medium, one end of the flexible assembly is mounted in the sheath in a limiting manner, another end of the flexible assembly is used as a telescopic end acting on the adjusting foot, and the telescopic end extends and retracts under action of the hydraulic medium to drive the adjusting foot to axially move, thereby implementing automatic leveling; and the flexible assembly comprises an oil press plate and an oil bag, an opening of the oil bag is in sealed connection with the oil press plate, and each oil nipple is arranged on the oil press plate and communicate with the oil bag.

9. A filling method of the washing machine hydraulic leveling device according to claim 1, comprising the following steps that:

the oil hole and the vent hole are opened;

an oiling device is connected to the oil hole, and hydraulic medium is injected into the oil hole;

the hydraulic medium flows into two hydraulic feet through the oil pipes from the two connecting oil nipples corresponding to the oil hole, respectively;

the hydraulic medium flows into another group of oil pipes after the two hydraulic feet are filled up with the hydraulic medium, and air in the oil pipe and the hydraulic foot is discharged through the vent hole under pressure of the hydraulic oil in a filling process; and the oil hole and the vent hole are closed after the filling is completed.

10. The washing machine hydraulic leveling device according to claim 3, wherein the oil pipe and the oil nipple of each hydraulic foot are in sealed connection through a clamping piece, and the oil pipe and the connecting oil nipples of the connecting piece are in sealed connection through the clamping piece.

11. The washing machine hydraulic leveling device according to claim 2, wherein the oil pipes and the oil nipples of each hydraulic foot are in sealed connection through a clamping piece, and the oil pipes and the connecting oil nipples of the connecting piece are in sealed connection through the clamping piece.

12. The washing machine hydraulic leveling device according to claim 2, wherein the oil nipple of each hydraulic foot and the connecting oil nipples of the connecting piece each comprises a chamfer part which is located at an end of each nipple to enable the oil pipe to be easily inserted into, and a barb part which is located behind the chamfer part and used for preventing the oil pipe from dropping out.

13. The washing machine hydraulic leveling device according to claim 5, wherein the oil nipple of each hydraulic foot and the connecting oil nipples of the connecting piece each comprises a chamfer part which is located at an end of each nipple to enable the oil pipe to be easily inserted into, and a barb part which is located behind the chamfer part and used for preventing the oil pipe from dropping out.

14. The washing machine hydraulic leveling device according to claim 6, wherein the oil nipple of each hydraulic foot and the connecting oil nipples of the connecting piece each comprises a chamfer part which is located at an end of each nipple to enable the oil pipe to be easily inserted into, and a barb part which is located behind the chamfer part and used for preventing the oil pipe from dropping out.

15. The washing machine hydraulic leveling device according to claim 2, wherein, the fixed part of each hydraulic foot is a sheath, and the movable part of each hydraulic foot is an adjusting foot arranged in the sheath and moves axially relative to the sheath;

each hydraulic foot further comprises a flexible assembly which is arranged in the adjusting foot and is used for accommodating the hydraulic medium, one end of the flexible assembly is mounted in the sheath in a limiting manner, another end of the flexible assembly is used as a telescopic end acting on the adjusting foot, and the telescopic end extends and retracts under action of the hydraulic medium to drive the adjusting foot to axially move, thereby implementing automatic leveling; and the flexible assembly comprises an oil press plate and an oil bag, an opening of the oil bag is in sealed connection with the oil press plate, and each oil nipple is arranged on the oil press plate and communicate with the oil bag.

16. The washing machine hydraulic leveling device according to claim 3, wherein, the fixed part of each hydraulic foot is a sheath, and the movable part of each hydraulic foot is an adjusting foot arranged in the sheath and moves axially relative to the sheath;

each hydraulic foot further comprises a flexible assembly which is arranged in the adjusting foot and is used for accommodating the hydraulic medium, one end of the flexible assembly is mounted in the sheath in a limiting manner, another end of the flexible assembly is used as a telescopic end acting on the adjusting foot, and the telescopic end extends and retracts under action of the hydraulic medium to drive the adjusting foot to axially move, thereby implementing automatic leveling; and the flexible assembly comprises an oil press plate and an oil bag, an opening of the oil bag is in sealed connection with the oil press plate, and each oil nipple is arranged on the oil press plate and communicate with the oil bag.

17. A filling method of the washing machine hydraulic leveling device according to claim 2, comprising the following steps that:

the oil hole and the vent hole are opened;

an oiling device is connected to the oil hole, and hydraulic medium is injected into the oil hole;

the hydraulic medium flows into two hydraulic feet through the oil pipes from the two connecting oil nipples corresponding to the oil hole, respectively;

the hydraulic medium flows into another group of oil pipes after the two hydraulic feet are filled up with the hydraulic medium, and air in the oil pipe and the hydraulic foot is discharged through the vent hole under pressure of the hydraulic medium in a filling process; and the oil hole and the vent hole are closed after the filling is completed.

18. A filling method of the washing machine hydraulic leveling device according to claim 4, comprising the following steps that:

the oil hole and the vent hole are opened;

an oiling device is connected to the oil hole, and hydraulic medium is injected into the oil hole;

the hydraulic medium flows into two hydraulic feet through the oil pipes from the two connecting oil nipples corresponding to the oil hole, respectively;

the hydraulic medium flows into another group of oil pipes after the two hydraulic feet are filled up with the hydraulic medium, and air in the oil pipe and the hydraulic foot is discharged through the vent hole under pressure of the hydraulic medium in a filling process; and the oil hole and the vent hole are closed after the filling is completed.

* * * * *